3,384,709
TRANSMISSION TIME-BANDWIDTH REDUCTION SYSTEM AND METHOD

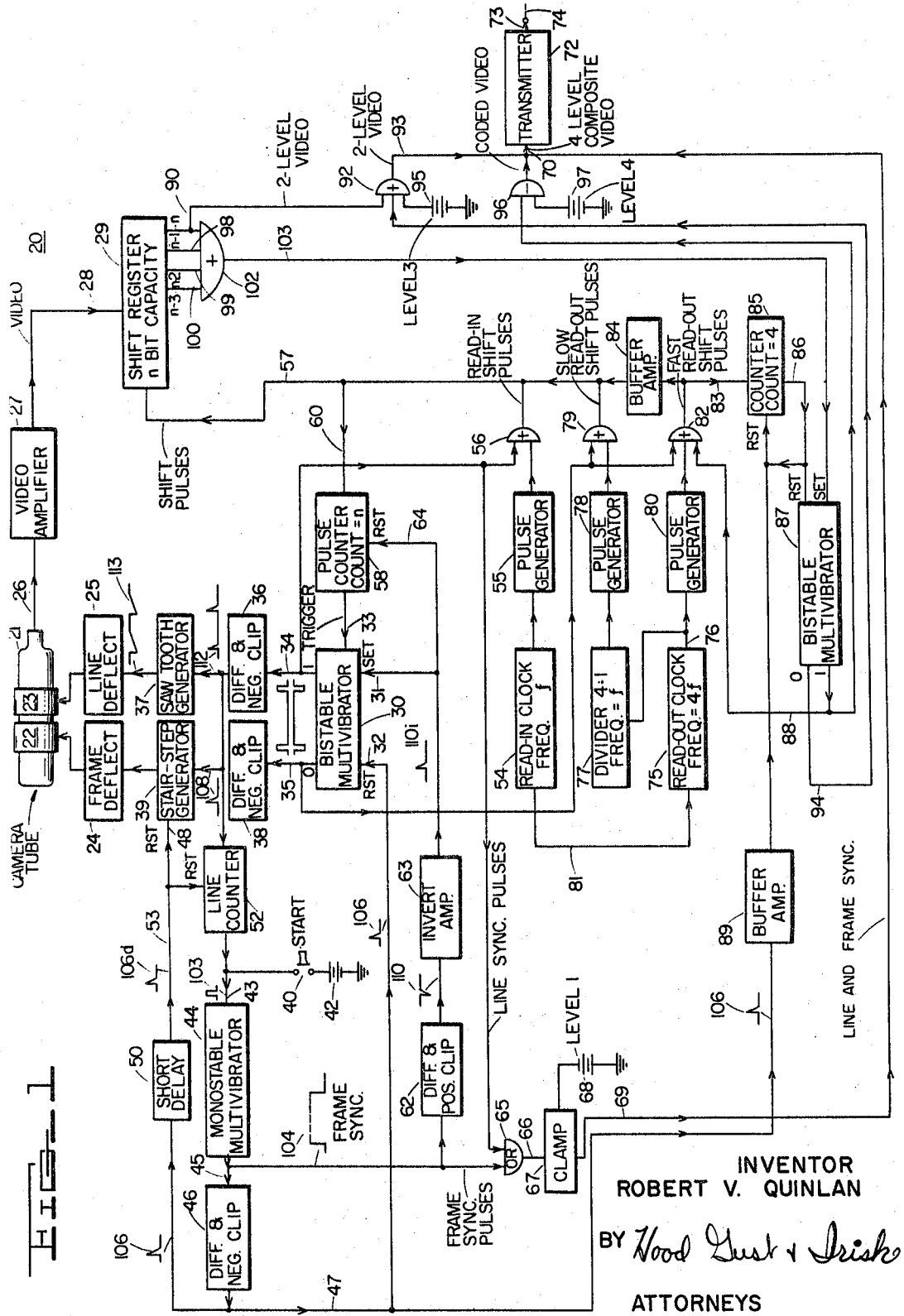

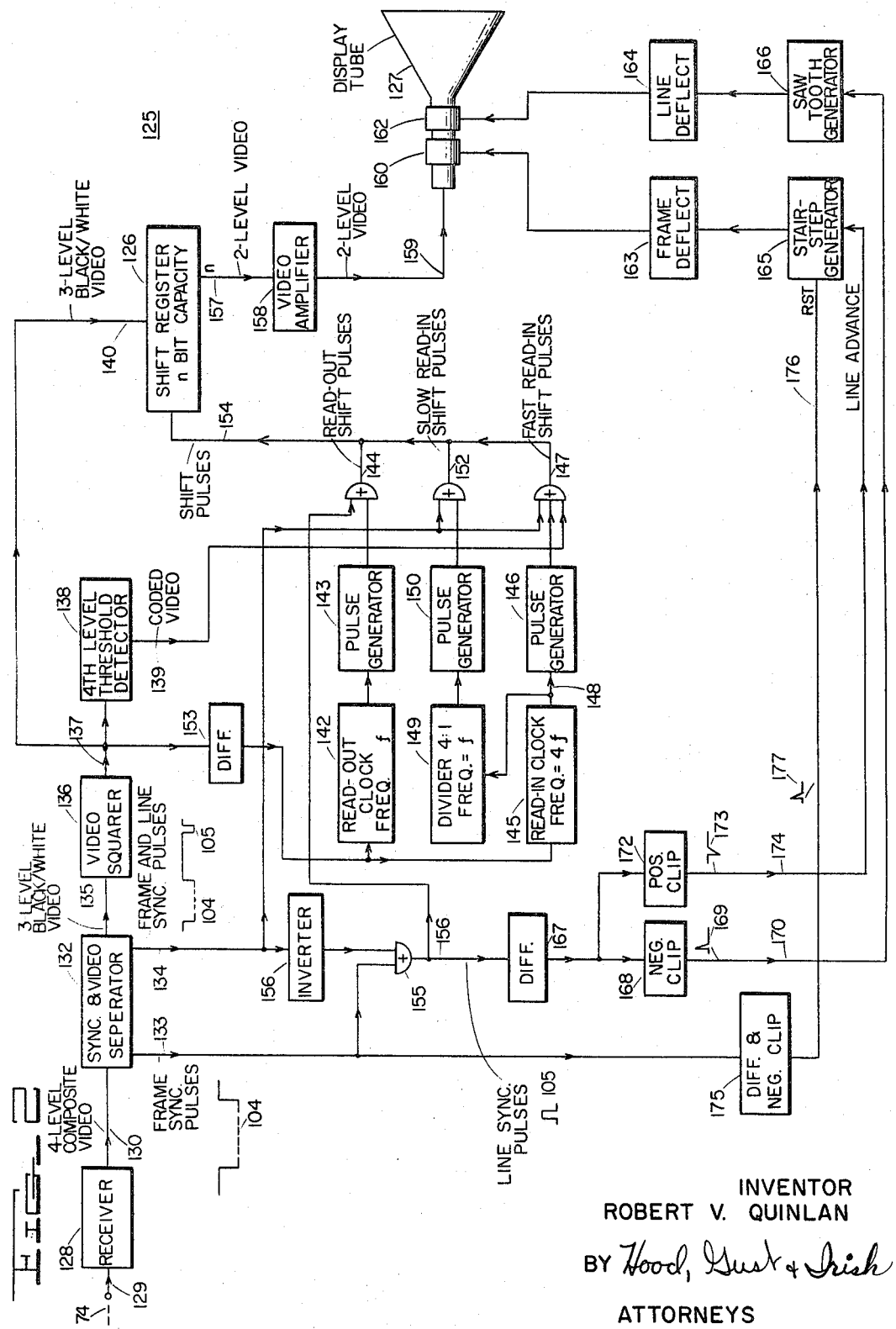

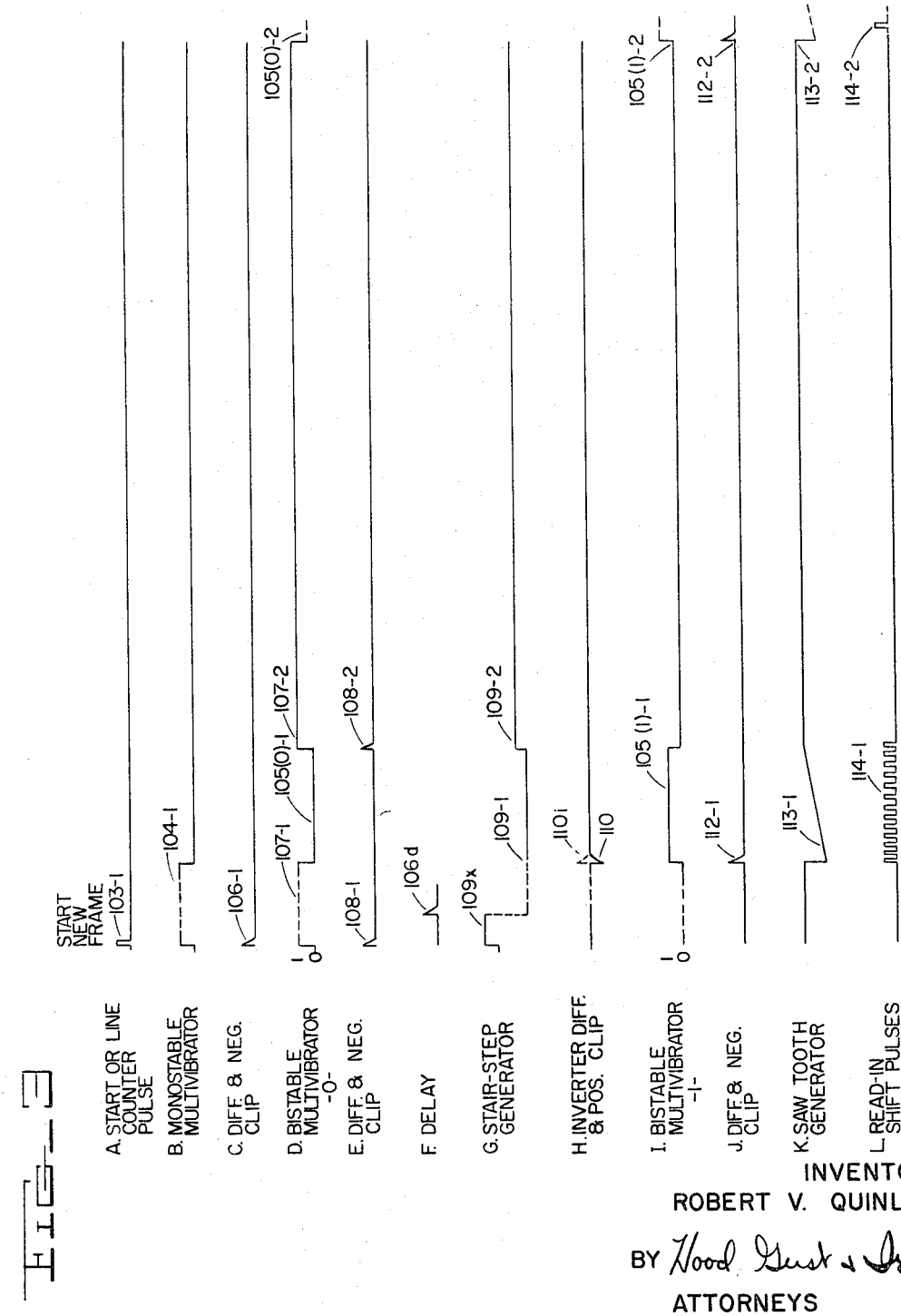

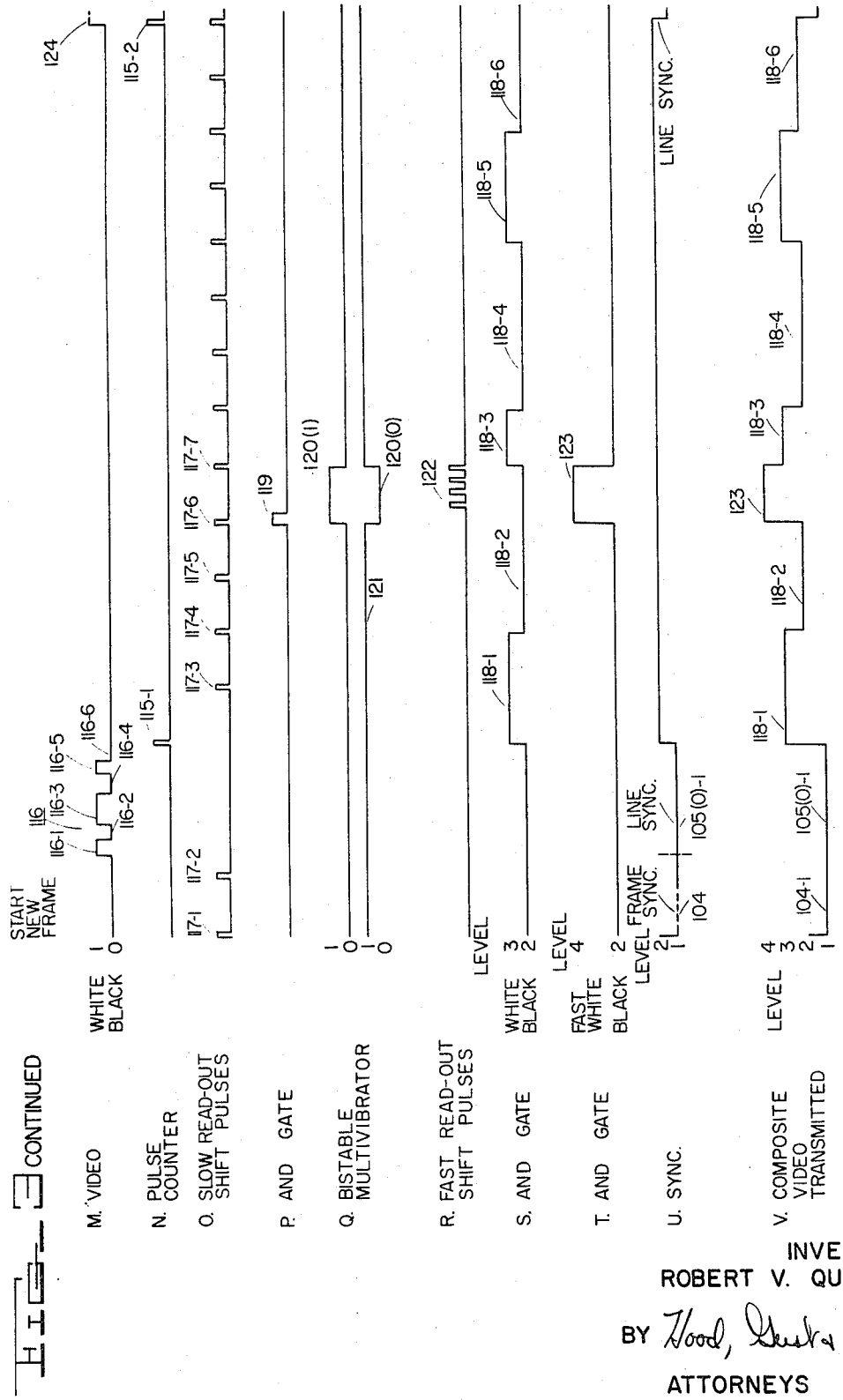

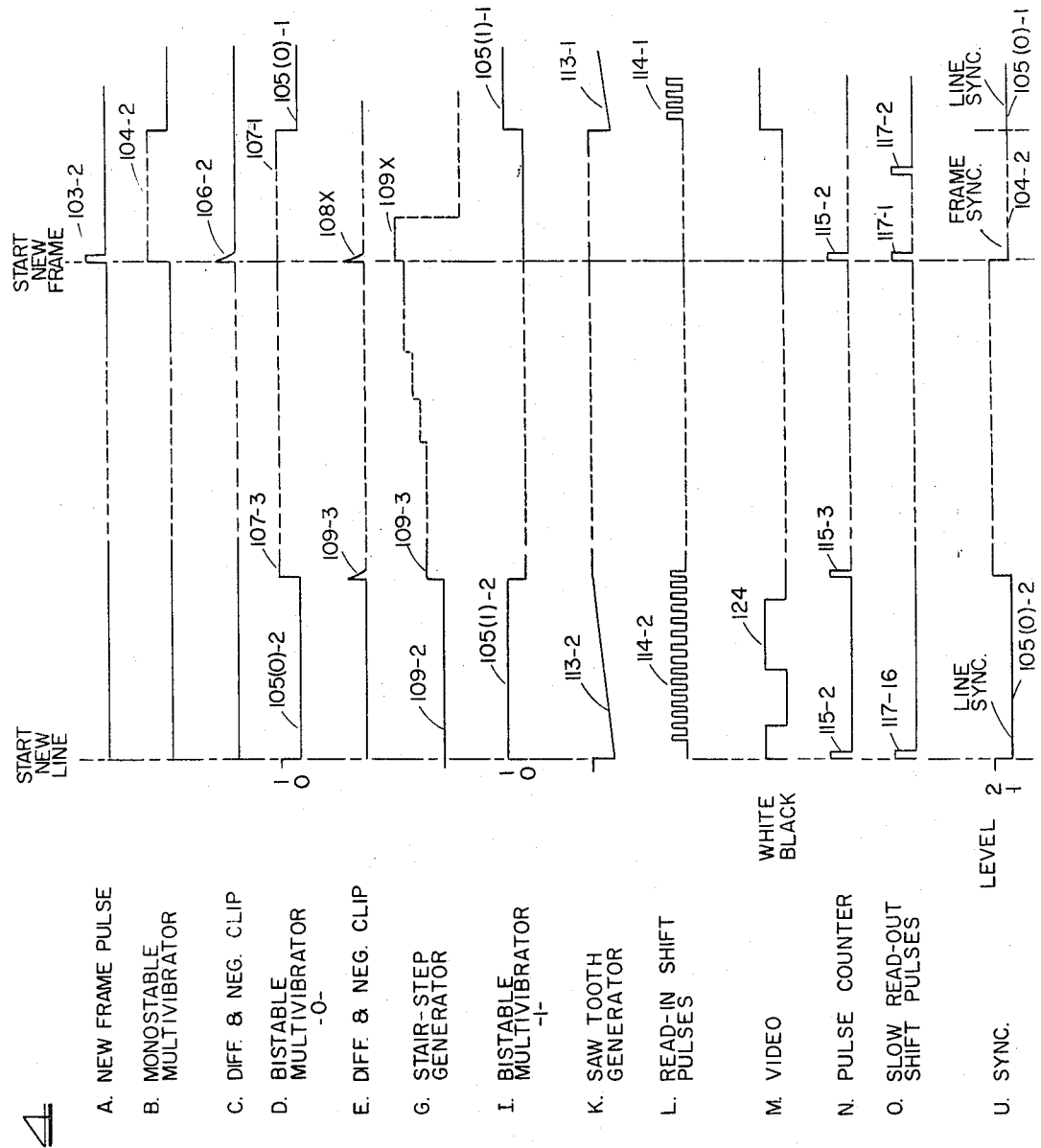

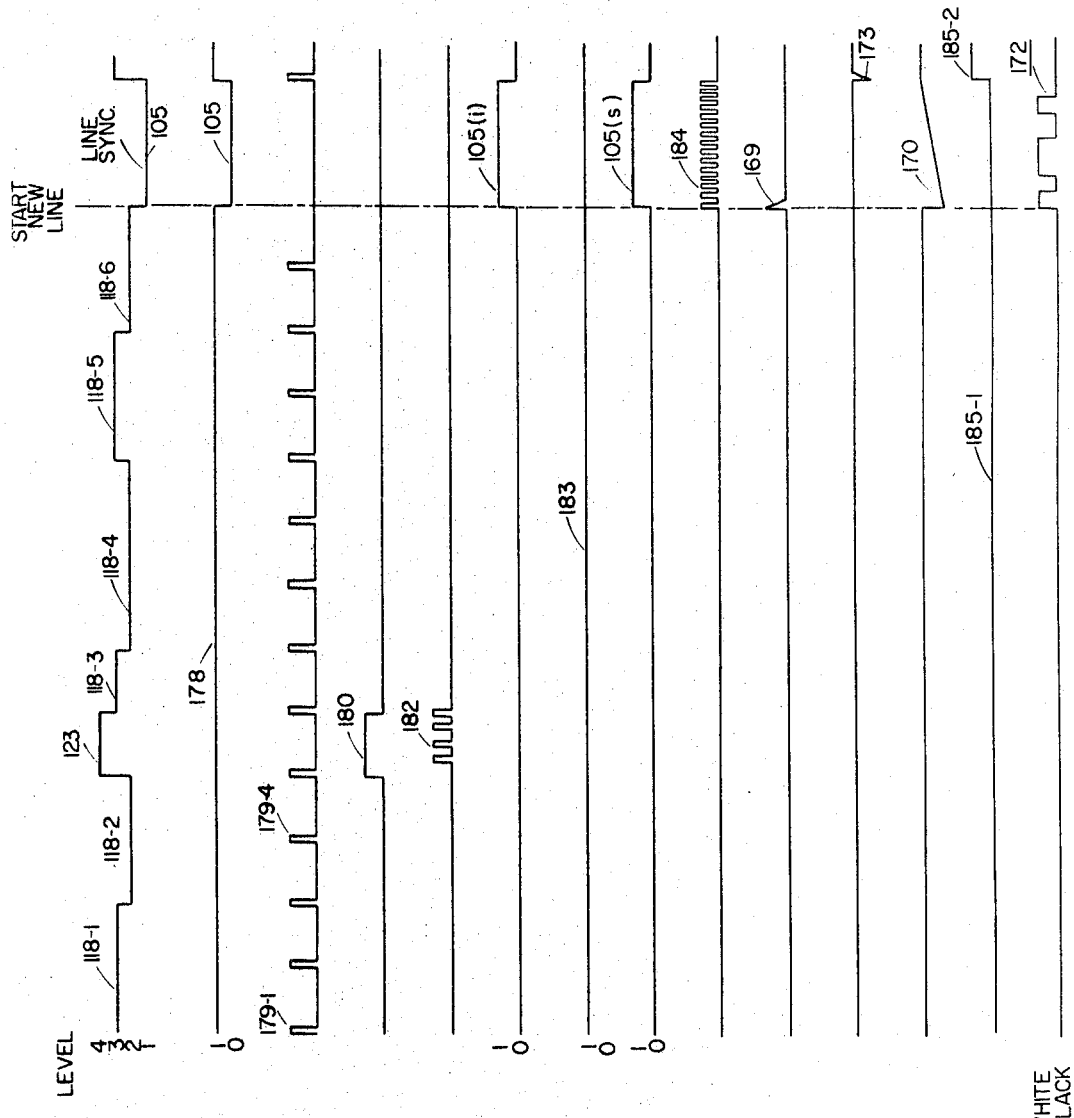

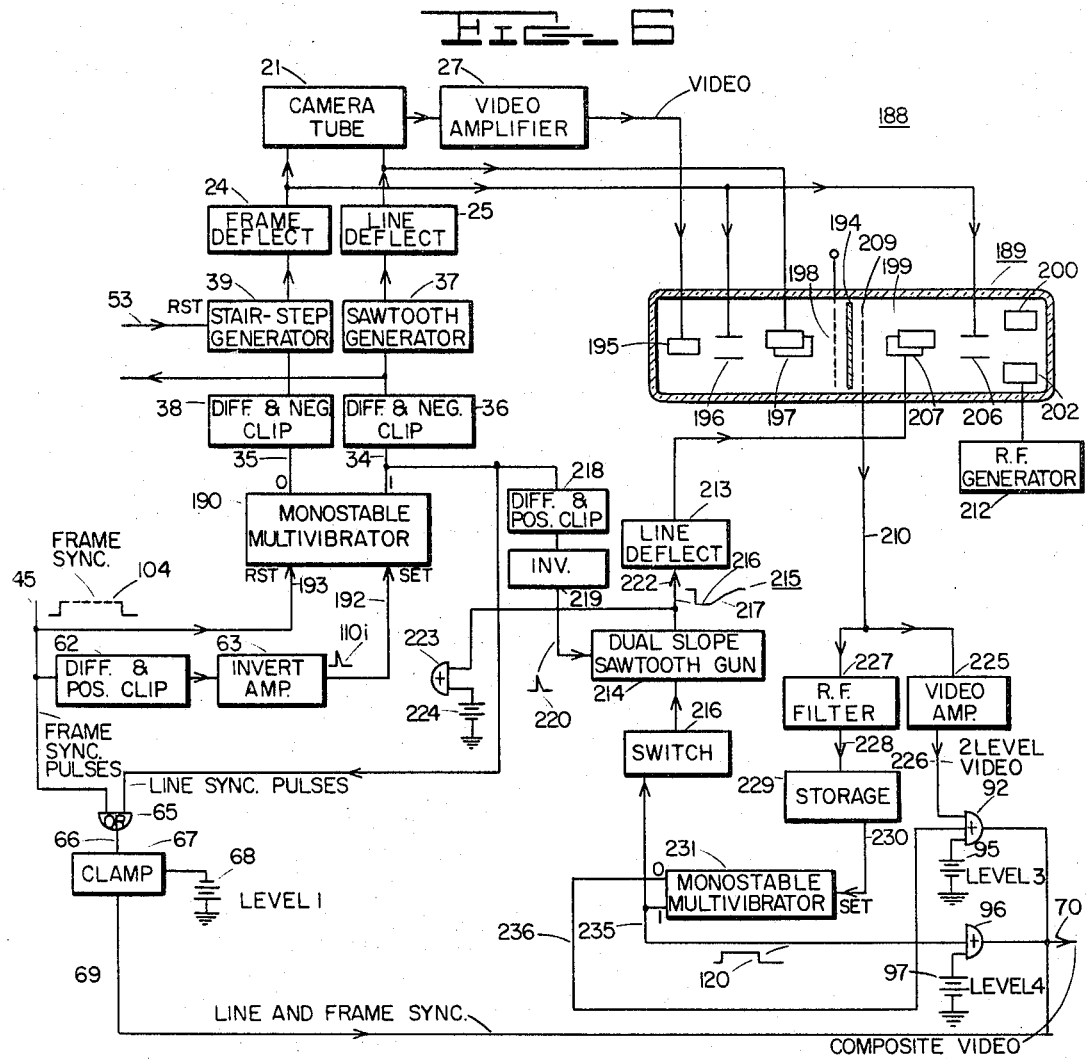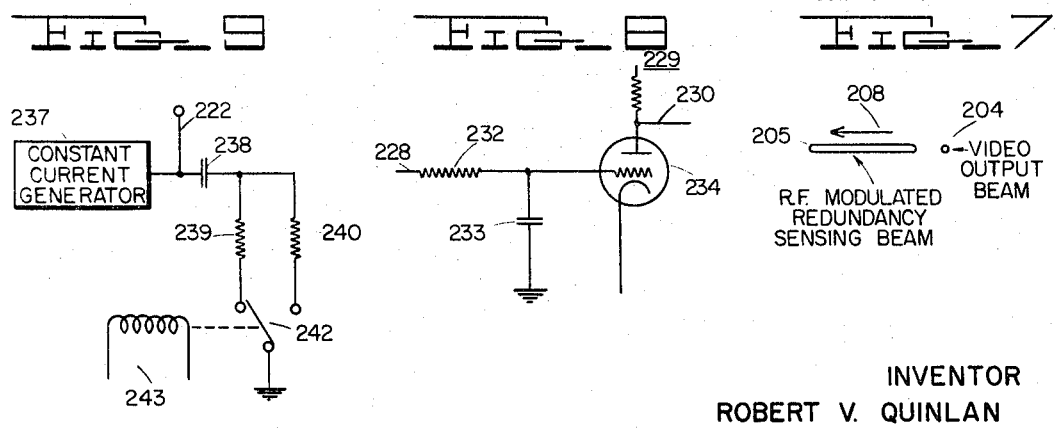

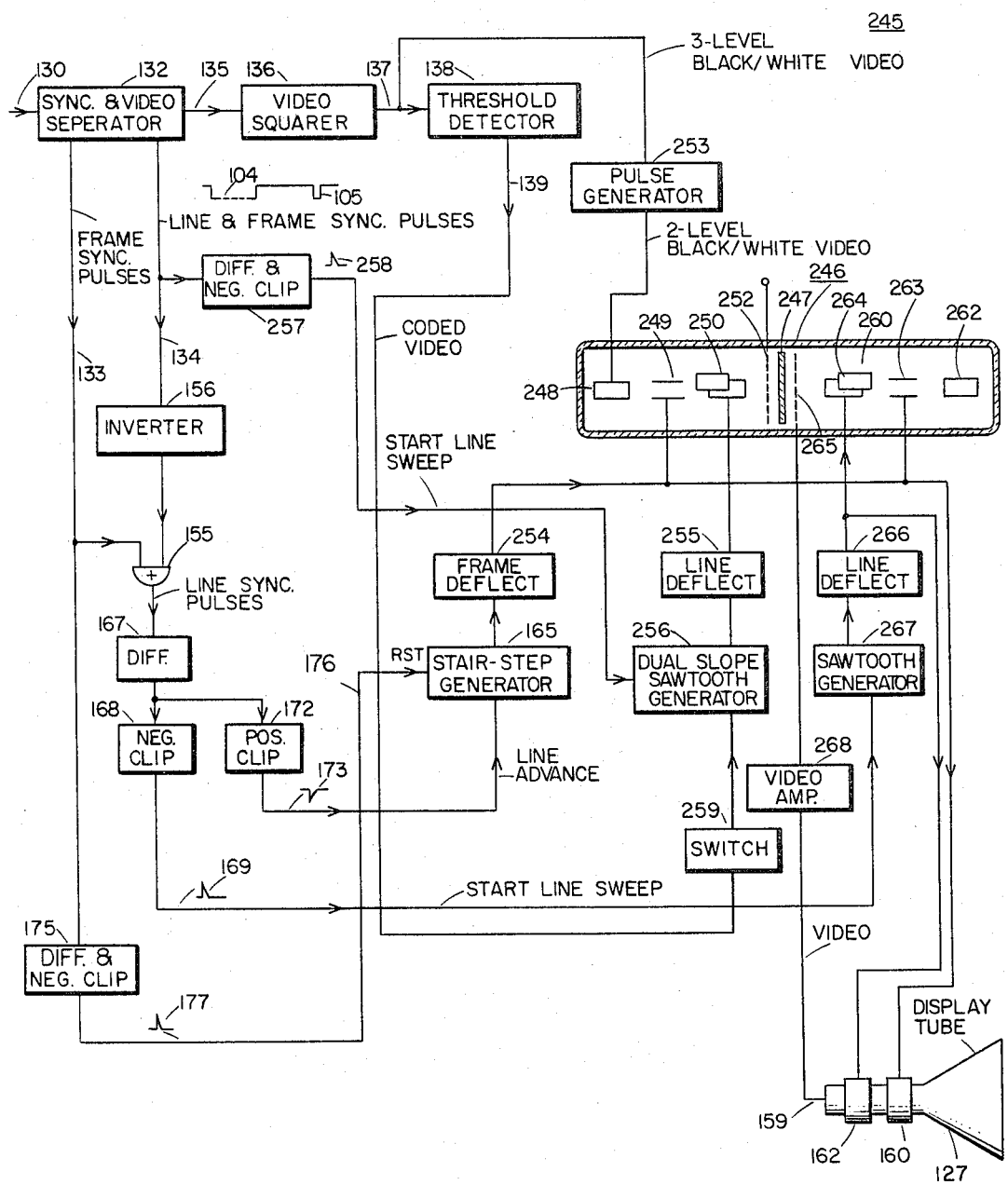

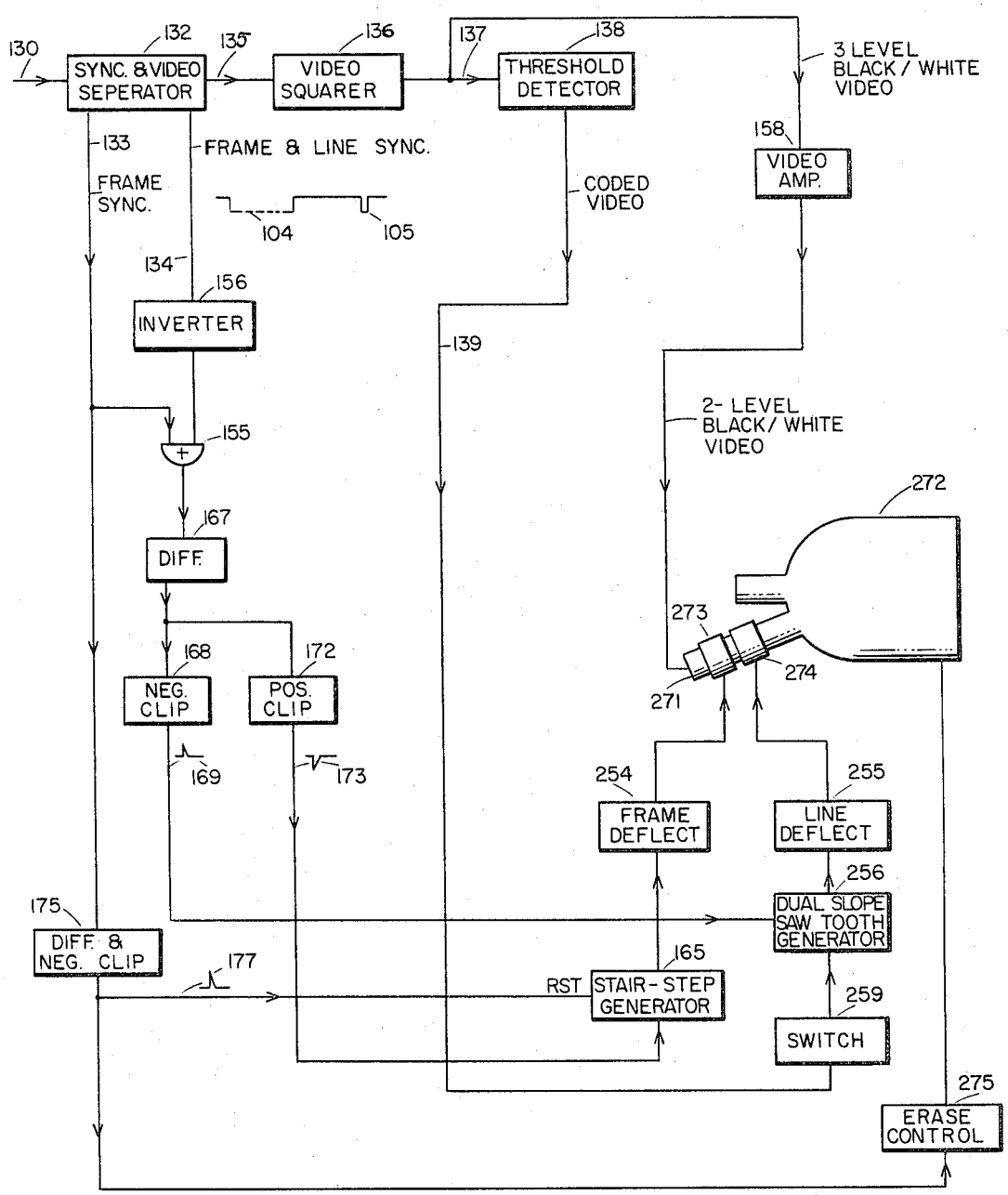

Robert V. Quinlan, Fort Wayne, Ind., assignor to International Telephone and Telegraph Corporation, Nutley, N.J., a corporation of Maryland
Filed Feb. 4, 1965, Ser. No. 430,408
27 Claims. (Cl. 178—6.8)

This invention relates generally to information transmission systems and methods, and more particularly to a system and method for reducing the transmission time and/or band-width of time-based electrical signals employed in information transmission systems.

Time-based electrical signals are utilized in certain information transmission systems including data transmission systems and television systems. Conventional data transmission systems employ binary pulses of fixed duration in coded sequences whereas conventional television systems employ pulses of varying duration; television systems for transmitting black and white copy employ binary pulses. In both data transmission and television systems, it is frequently desirable to provide minimum transmission time. Pulse width is the reciprocal of bandwidth, and pulse width is in turn directly proportional to the transmitting speed in the case of data transmission systems and to the scanning speed in the case of television systems. Thus, transmission of binary coded data at the requisite high speed and transmission of the minimum size picture element at fast scanning rates with optimum resolution has involved a wide band of signal frequencies, thus in turn necessitating employment of a wide band transmission facility such as a micro-wave radio link or coaxial cable. Such wide band transmission facilities are, however, expensive and furthermore are not always readily available or feasible. Thus, there are many instances where it is desirable to transmit such information-conveying time-based electrical signals over narrow band facilities, such as ordinary telephone lines. In the case of binary coded data transmission systems, this has required operation of the transmitting apparatus at a correspondingly low speed, and in the case of television systems, has necessitated the employment of slow scanning rates; slow scanning has in turn required the use of special camera tubes employing target electrodes having unusually long storage capabilities.

Most binary coded data and most images to be transmitted by television, particularly printed and written documents such as an ordinary type-written page, include a substantial amount of redundant information, such as the background or "white" color upon which the contrasting or "black" intelligence information appears. In order to provide faster transmission rates and/or a narrower transmission bandwidth, various transmission time-bandwidth compression techniques have been proposed in which a predetermined amount of redundant information in the initial information-conveying signal is detected and transmitted as a single signal element. In order to obtain a reduction in the transmission time and/or transmission bandwidth of time-based electrical signals, a system must incorporate either variable speed signal generation, i.e., slow for normal information and fast for redundant information, storage of the initial signal generated at a constant rate and subsequent variable speed transmission of the stored signal, or some combination of variable speed signal generation, storage and variable speed transmission.

In the case of television systems, the simultaneous changing of sweep rates in the camera tube and display tube during the active scanning interval presents many difficult circuit problems since the deflection circuits in the camera tube and the display tube are different thus producing different transient effects, which in turn makes it difficult for the two beams accurately to track, especially at high scanning rates. Also, as the scanning rate is increased, there is generally a corresponding improvement in the signal-to-noise ratio. Thus, it is desirable that the camera tube and display tube both be scanned at the same constant, relatively fast rate.

In one time-bandwidth compression system for television employing storage of the initially generated signal, it has been proposed to store an entire frame during generation and subsequently to transmit the information content of the frame at a constant rate with the redundant information removed. This method potentially offers a large transmission time-bandwidth reduction since area coding of redundant information is possible. However, such a system requires an extremely large storage capacity, i.e., all of the minimum picture elements for all of the lines of a frame, thus necessitating extremely expensive terminal equipment.

The system and method of the present invention utilizes constant speed generation of the initial signal, storage of the initial signal as it is generated, subsequent variable speed transmission of the stored signal in accordance with its redundancy, storage of the transmitted signal as it is received, and subsequent constant speed read-out of the stored signal. As applied to a television system, one line at a time is generated and stored, the contents of that line are examined, and the time-bandwidth reduction method is employed to reduce redundancy in the scanned line. With this system and method, the scanning rate for each line is constant; however, the time between adjacent lines during which the stored signal is transmitted will vary depending upon the amount of redundant information in each line.

In accordance with the broader aspects of the invention therefor, an initial time-based electrical signal conveying the information to be transmitted is generated during successive spaced first intervals and that initial signal is sequentially stored as it is generated. A second time-based electrical signal responsive to the stored initial signal is generated at a first rate during successive second intervals intermediate the first intervals, the simultaneous presence in the stored initial signal of a predetermined amount of adjacent redundant information is sensed, and the rate of generation of the second signal is increased to a second rate in response thereto, the second signal being modified to provide a coded signal component in response to such sensing. The second signal is transmitted as it is generated, i.e., during the second intervals, and received at a remote location. At the receiving location, the first intervals intermediate the received second signals are detected, the coded signal components are separated from the received second signals, and the received second signals are sequentially stored as they are received at the first rate, the rate of the storage of the received second signal being increased to the second rate in response to the separated coded signal components. The information contained in the thus-stored second signals is then converted to output information.

The above-mentioned and other features and objects of the invention and the manner of obtaining them will become more apparent and the invention itself will be best understood by reference to the following description of embodiments of the invention taken in conjunction with the accompanying drawings, wherein:

FIG. 1 is a diagram schematically illustrating the transmitting station of one embodiment of the invention incorporated in a television system for transmitting two colors, i.e., black and white information;

FIG. 2 is a diagram schematically illustrating one embodiment of the receiving station for the transmitting station of FIG. 1;

FIG. 3 is a diagram illustrating wave forms found in the transmitting station system of FIG. 1 and useful in explaining the mode of operation of the invention;

FIG. 4 is a diagram showing further wave forms found in the transmitting station of FIG. 1;

FIG. 5 is a diagram showing wave forms found in the receiving station of FIG. 2;

FIG. 6 is a fragmentary schematic diagram showing modification of the transmitting station of FIG. 1 to utilize a storage tube;

FIG. 7 is a fragmentary diagram showing the read-out beams employed in the storage tube of FIG. 6;

FIG. 8 is a fragmentary schematic diagram showing the redundant signal storage element of FIG. 6;

FIG. 9 is a fragmentary schematic diagram showing the dual slope sawtooth generator of FIG. 6;

FIG. 10 is a schematic diagram showing a modification of the receiving station of FIG. 2 to employ a storage tube; and FIG. 11 is a schematic diagram showing another embodiment of a receiving station useful with the transmitting station of FIG. 1 or 6.

Referring now to FIG. 1, the camera tube and transmitting station of one embodiment of the invention for transmitting black and white television images is shown, generally indicated at 20. A camera tube 21 is provided, which may be any conventional form of image tube such as a vidicon, image orthicon, iconoscope, or image dissector. Camera tube 21 incorporates conventional vertical and horizontal deflection means, shown here as being deflection yokes 22, 23 coupled to conventional frame and line deflection circuits 24, 25. Camera tube 21 has a video signal output circuit 26 which may be coupled to a conventional video amplifier 27. It will be understood that when copy comprising two contrasting colors, such as black and white, is exposed to camera tube 21, a time-based video signal will be generated in output circuit 26 consisting of binary pulses of varying duration having upper and lower amplitude levels. In the system herein illustrated and described, the video signal pulses are assumed to be "white"-positive. The output circuit of video amplifier 27 is coupled to the signal input circuit 28 of a conventional shift register 29 having a bit storage capacity equal in number to the number $n$ of video signals elements to be transmitted in one line. In a system for transmitting typewritten copy in which the minimum character width is typically .01 inch, 400 picture elements may be provided in one line and thus shift register 29 will have a 400 bit storage capacity.

A conventional bistable multivibrator 30 is provided having "set," "reset" and "trigger" input circuits 31, 32, 33 and "one" and "zero" output circuits 34, 35. The "one" output circuit 34 of bistable multivibrator 30 is coupled to a conventional differentiating and negative clipping circuit 36 which in turn is coupled to a conventional sawtooth generator 37. Sawtooth generator 37 is coupled to the line deflection circuit 25 of camera tube 21. The "zero" output circuit 35 of bistable multivibrator 30 is coupled to conventional differentiating and negative clipping circuit 38 which in turn is coupled to a conventional stair-step function generator 39. Stair-step generator 39 is coupled to the frame deflection circuit 24 of camera tube 21.

A momentary contact "start" switch 40 couples a suitable source of potential, such as battery 42 to the trigger signal input circuit 43 of a conventional monostable multivibrator 44. Output circuit 45 of the monostable multivibrator 44 is coupled to a conventional differentiating and negative clipping circuit 46 which has its output circuit 47 coupled to the "reset" input circuit 48 of stair-step generator 39 by a conventional delay line 50 providing a short delay, as will be hereinafter described. The differentiating and negative clipping circuit 36 is also coupled to a conventional pulse counting circuit 52 which has its output circuit coupled to the trigger signal input circuit 43 of the monostable multivibrator 44. Output circuit 53 of the delay line 50 is also coupled to the "reset" input circuit of the pulse counter 52. Output circuit 47 of the differentiating and negative clipping circuit 46 is also coupled to the "reset" input circuit 32 of the bistable multivibrator 30.

A conventional clock pulse generator 54 is provided coupled to a conventional pulse generator 55 which in turn is coupled to one of the input circuits of a conventional AND gate 56. The output circuit of the AND gate 56 is coupled to the shift pulse input circuit 57 of the shift register 29. As will be hereinafter more fully described, the clock pulse generator 54 generates read-in shift pulses for shifting the video signal provided by camera tube 21 into the shift register 29. In an embodiment in which each line is divided into 400 elements and with shift register 29 thus having a 400 bit storage capacity, and assuming that the shortest pulse which can be transmitted in the internal circuitry of the transmitting station 20 is twenty micro-seconds, a scanning period of 8000 microseconds is therefore indicated. As will be hereinafter described, the video signal generated during scanning of one line in the camera tube 21 is shifted into the shift register 29 as it is generated and thus the video signal generated during one line must be sampled at a 50 kc. rate, i.e., the clock pulse generator 54 will accordingly generate read-in shift pulses at a 50 kc. rate. The "one" output circuit 34 of the bistable multivibrator 30 is coupled to the other input circuit of the AND gate 56.

Another conventional pulse counter 58 is provided having a count $n$ corresponding to the bit storage capacity of shift register 29. Thus, with shift register 29 having a bit storage capacity of $n$ bits, pulse counter 58 will provide one output signal in response to $n$ input pulses. Shift pulse input circuit 57 of the shift register 29 is also coupled to the input circuit 60 of pulse counter 58 which has its output circuit coupled to the trigger signal input circuit 33 of the bistable multivibrator 30.

Output circuit 45 of the monostable multivibrator 44 is also coupled to a conventional differentiating and positive clipping circuit 62 which in turn is coupled to the "set" input circuit 31 of bistable multivibrator 30 by a conventional inverting amplifier 63. Inverting amplifier 63 is also coupled to the "reset" signal input circuit 64 of pulse counter 58. Output circuit 45 of monostable multivibrator 44 is also coupled to one of the input circuits of the conventional OR gate 65, OR gate 65 having its other signal input circuit coupled to the "one" output circuit 34 of the bistable multivibrator 30. Output circuit 66 of the OR gate 65 is coupled to a conventional clamping circuit 67 which clamps the output signal to a predetermined level, shown here as being a negative potential provided by battery 68. Output circuit 69 of the clamping circuit 67 is coupled to the signal input circuit 70 of a conventional transmitter 72. Transmitter 72 may be of the type in which the input signal is amplitude modulated onto a carrier frequency provided by a suitable carrier frequency generator (not shown). Output circuit 73 of the transmitter 72 is adapted to be coupled to a conventional transmission faciilty, shown by the dashed line 74, which may be a narrow band transmission facility such as an ordinary voice-band telephone line.

Read-out shift pulses for shifting the stored video signal out of shift register 29 are provided by a conventional clock pulse generator 75 having its output circuit 76 coupled to a conventional dividing or count-down circuit 77. Dividing circuit 77 is coupled to a conventional pulse generator 78 which in turn is coupled to one of the input circuits of a conventional AND gate 79. The other signal input circuit of AND gate 79 is coupled to the "zero" output circuit 35 of bistable multivibrator 30 and its output circuit is coupled to shift pulse input circuit 57 of shift register 29. Output circuit 76 of the clock pulse generator 75 is also coupled to pulse generator 80 which is in turn coupled to one of the signal input circuits of AND gate 82. The other signal input circuit of AND gate 82 is coupled to the "zero" output circuit 35 of bistable multivibrator 30 and its output circuit 83 is coupled to the shift pulse input circuit 57 of shift register 29 by a conventional buffer amplifier 84. Output circuit 83 of AND gate 82 is also coupled to the input circuit of a conventional pulse counting circuit 85 which has its output circuit 86 coupled to the "reset" input circuit of a conventional bistable multivibrator 87. The "one" output circuit 88 of bistable multivibrator 87 is coupled to the remaining signal input circuit of the AND gate 82. Output circuit 47 of differentiating and clipping circuit 46 is coupled to the "reset" circuit of counter 85 and to the "reset" circuit of bistable multivibrator 87 by a conventional buffer amplifier 89.

The final or $n$ output circuit 90 of shift register 29 is coupled to one of the signal input circuits of AND gate 92 which has its output circuit 93 coupled to the input circuit 70 of the transmitter 72. The "zero" output circuit 94 of bistable multivibrator 87 is coupled to another of the signal input circuits of AND gate 92 which has its remaining signal input circuit coupled to a source of fixed potential, shown here as battery 95. The "one" output circuit 88 of bistable multivibrator 87 is also coupled to one of the signal input circuits of AND gate 96 which has its output circuit coupled to the input circuit 70 of transmitter 72. The other signal input circuit of AND gate 96 is coupled to a suitable source of fixed potential, shown here as battery 97.

In the illustrated embodiment in which a redundancy of four video elements stored in a shift register 29 is sensed, the output circuits 90, 98, 99, 100 respectively coupled to the last four storage elements of shift register 29 are respectively coupled to AND gate 102 which has its output circuit 103 coupled to the "set" input circuit of bistable multivibrator 87.

With a 400 bit storage capacity provided in shift register 29 and with transmission facility 74 being an ordinary voice-band commerical telephone line, a maximum transmission rate for th esignal elements stored in a shift register 29 of one kc. is indicated. Thus, the clock pulse generator 75 provides clock pulses at a 4 kc. rate and the dividing circuit 77 divides this 4 kc. frequency to the one kc. rate which when coupled to the shift pulse input circuit 57 of the shift register 29, as will be hereinafter-described, provides the normal or slow shift pulses for shifting the stored video signal out of the shift register 29 at the normal or slow rate. Further, as will also be hereinafter more fully described, the clock pulse generator 75 when directly coupled to shift pulse input circuit 57 in response to sensing of the simultaneous presence of four signal elements having the same level by the AND gate 102 provides shift pulses at the fast rate for shifting the stored video signal out of the shift register 29 at the fast rate.

Referring now additionally to FIG. 3, momentary actuation of the "start" switch 40 generates a positive triggering pulse 103–1 which is applied to the monostable multivibrator 44, as shown in FIG. 3A. Triggering pulse 103–1 actuates monostable multivibrator 44 to generate frame synchronizing signal 104–1, as shown in FIG. 3B, which has a duration equal to many of the line synchronizing pulses 105(0) and 105(1) to be hereinafter described. Frame synchronizing signal 104–1 is differentiated and the negative spike clipped by differentiating and clipping circuit 45 to provide a positive leading edge differentiated signal spike 106–1, as shown in FIG. 3C. The leading edge signal 106–1 is applied to the "reset" circuit 32 of bistable multivibrator 30 to reset the same to provide positive signal 107–1 in the "zero" output circuit 35, as shown in FIG. 3D. The differentiated leading edge spike 106–1 is also applied by buffer amplifier 89 to reset the counter 85 and bistable multivibrator 87.

If at the instant of actuation of "start" switch 40, bistable multivibrator 30 is in its "set" state, generation of frame synchronizing signal 104–1 and leading edge spike 106–1 will reset bistable multivibrator 30 thereby generating signal 107–1 in its "zero" output circuit 35 which is differentiated by differentiating and negative clipping circuit 38 to provide a leading edge differentiated spike 108–1 as shown in FIG. 3E. Leading edge spike 108–1 is applied to stair-step generator 39 actuating the same to generate the next successive higher stair-step voltage, as shown at 109 in FIG. 3G. The differentiating leading edge spike 106–1 is delayed for a short period of delay line 50, as shown at 106d in FIG. 3F, and the delayed spike 106d is applied to the reset circuit 48 of the stair-step generator 49 to reset the same to its lowest level, as shown at 109–1 in FIG. 3G. This delay is required since direct application of leading edge spike 106–1 to the resetting circuit 48 of stair-step generator 39 might result in resetting the stair-step generator to its lowest level prior to application of the differentiated spike 108–1 thereto from the differentiating and clipping circuit 38, thus resulting in the premature generation of the second level stair-step voltage, i.e., the first line advance pulse 109–2. The delayed differentiated spike 106d is also applied to the line counter 52 to reset the same to zero count.

As will be hereinafter more fully described, the time between line scans will vary depending upon the amount of redundant information stored in the shift register 29 and thus, a conventional sawtooth frame sweep cannot be employed for the camera tube 21. For this reason, the stair-step sweep generator 39 is employed.

At the conclusion of the frame synchronizing signal 104–1 generated by monostable multivibrator 44, a trailing edge differentiated spike 110 is generated by differentiating and positive clipping circuit 62, differentiated spike 110 being inverted by inverting amplifier 63 to provide a positive trailing edge spike 110$i$, as shown in FIG. 3H. The inverted trailing edge spike 110$i$ is applied to the "reset" circuit 64 of the pulse counter 58 to reset the same to zero count and is applied to the "set" circuit 31 of bistable multivibrator 30 to set the same to generate line synchronizing pulse 105(1)–1 in its "one" output circuit 34 as shown in FIG. 3I. The "one" output signal 105(1)–1 from the bistable multivibrator 30 is differentiated by the differentiating and negative clipping circuit 36 to provide leading edge spike 112–1, as shown in FIG. 3J, the leading edge spike 112–1 being applied to trigger the sawtooth generator 37 causing it to generate one sawtooth sweep voltage 113–1, as shown in FIG. 3K. The sawtooth sweep voltage 113–1 is applied to the line deflection circuit 25 of the camera tube 21 causing generation of one video signal line 116, as shown in FIG. 3M.

The read-in clock pulse generator 54 is of the free-running variety; however, the "one" output signal 105(1)–1 from the bistable multivibrator 30 is also applied to AND gate 56 thereby enabling the same to pass the read-in shift pulses 114–1 to the shift pulse input circuit 57 of shift register 29, as shown in FIG. 3L. The read-in shift pulses 114–1 shift the video signal in output circuit 26 of the camera tube 21 and in the output circuit of video amplifier 27 into the shift register 29, as is well known to those skilled in the art.

The read-in shift pulses 114–1 are simultaneously applied to the pulse counter 58 and when the $n$ shift pulses 114–1 have been counted thereby, thereby indicating that "$n$" video signal elements have been shifted into shift register 29 thereby filling the same, the counter 58 provides output pulse 115–1, as shown in FIG. 3N. Output pulse 115–1 from the pulse counter 58 is applied to the "trigger" circuit 33 of bistable multivibrator 30 thereby causing it to change its state to terminate the "one" output pulse 105(1)–1 and to initiate a "one" output signal 107–2 in its "zero" output circuit 35, as shown in FIG. 3D. Termination of the "one" output signal 105(1)–1 in the "one" output circuit 34 of the bistable multivibrator 30 as shown in FIG. 3I, removes the enabling signal from the AND gate 56 thus terminating application of the read-in shift pulses 114–1 to the shift pulse input circuit 57 of the shift register 29. In describing the mode of operation of the transmitting station 20 with the aid of FIG. 3, it is assumed for the purposes of ease of illustration that the storage capacity $n$ of the shift register 29 is sixteen bits and therefore that the pulse counter 58 counts sixteen read-in shift pulses 114–1 and provides output pulse 115 in response thereto, the video signal provided by camera tube 21 during the "one" output signal 105(1)–1 from the bistable multivibrator 30 thus being divided or sampled into sixteen video signal elements which are sequentially shifted into and stored in the shift register 29 by the read-in shift pulses 114–1. Referring now to FIG. 3M, the video signal 116 generated during the "one" signal 105(1)–1 provided by bistable multivibrator 30 is shown to be formed of two "white" elements 116–1, two "black" elements 116–2, five "white" elements 116–3, three "black" elements 116–4, two "white" elements 116–5, and two "black" elements 116–6, in succession.

It will be seen that the "one" signal 107–1 provided in the "zero" output circuit 35 of bistable multivibrator 30 during the frame synchronizing signal 104–1 is applied to the AND gate 79 thus enabling the same to pass slow read-out shift pulses 117–1, 117–2 to the shift pulse input circuit 57. However, as will be hereinafter more fully described, the frame synchronizing signal 104–1 clamps the signal at circuit 70 to battery potential 68 which corresponds to level 1, so the application of the slow read-out shift pulses 117–1, 117–2 to the shift register 29 during the frame synchronizing signal 104 is of no effect. As indicated above, application of the output pulse 115–1 from the pulse counter 58 to the bistable multivibrator 30 in response to counting the sixteen read-in shift pulses 114–1 shifts the state of bistable multivibrator 30 to initiate the "one" signal 107–2 in "zero" output circuit 35 and terminate the "one" signal 105(1)–1 in "one" output circuit 34, thus terminating application of the read-in shift pulses 114–1 to the shift pulse input circuit 57. The leading edge of the "one" signal 107–2 generated in the "zero" output circuit 35 of bistable multivibrator 30 is differentiated by the differentiating and clipping circuit 38 to provide leading edge spike 108–2 which, in turn, actuates the stair-step generator 39 to provide a second stair-step frame deflection voltage 109–1, as shown in FIGS. 3D, E and G. The leading edge spike or line advance pulse 108–2 is also applied to the line counter 52 and is counted thereby. Thus, during a first interval established by bistable multivibrator 30, i.e., during "one" signal 105(1)–1 in the "one" output circuit 34, one line of video signal information 116 generated at a constant rate in camera tube 21 by the sawtooth sweep voltage 113–1 is shifted into the shift register 29 at a fast rate by the read-in shift pulses 114–1 generated by the read-in clock 54. During the next interval of time immediately following the read-in interval during which scanning of the camera tube 21 is interrupted, the video signal elements which were stored in the shift register 29 during the immediately preceding scanning interval are slowly read-out of the shift register and transmitted over the transmission facility 74 by the transmitter 72. The read-in clock pulse generator 54 and the read-out clock pulse generator 75 are preferably locked, as schematically shown at 81. Application of the "one" signal 107–2 appearing in the "zero" output circuit 35 of bistable multivibrator 30 to AND gate 79 enables the same to pass the slow read-out shift pulses 117 to shift pulse input circuit 57 of the shift register 29. It will be seen that the last or $n$th read-in shift pulse of the first group 114–1 shifted the first element of the two "white" signal elements 116–1 into the last or $n$th section of shift register 29 to which output circuit 90 is coupled thereby initiating the third level output signal 118–1 in the output circuit 93 of the AND gate 92. It will be seen that the first three slow read-out shift pulses 117–3, 117–4, 117–5 passed by the AND gate 79 following application of the enabling signal 107–2 thereto will shift the second element of the "white" video signal 116–1 and the two elements of "black" video signal 116–2 out of the shift register 29 thereby completing the third level signal 118–1 and providing second level signal 118–2 in the output circuit 93 of AND gate 92. Meanwhile, the slow read-out shift pulses 117–3, 117–4, 117–5 have shifted the first three elements of "white" signal 116–3 into the shift register sections $n$–1, $n$–2, $n$–3 to which output circuits 98, 99 and 100 are coupled. Thus, application of the fourth slow read-out shift pulse 117–6 to the shift register 29 will shift the first four elements of "white" video signal 116–3 into the last four sections of the shift register 29 to which output circuits 90, 98, 99, 100 are coupled. Since all of these elements now simultaneously appearing in the final four sections of shift register 29 are at the "white" level AND gate 102 is enabled to provide redundancy sensing signal 119 in its output circuit 103, as shown in FIGS. 3O and P. Signal 119 is applied to the "set" input circuit of bistable multivibrator 87 thereby causing it to change its state to provide a "one" level signal 120(1) in its "one" output circuit 88. The "one" signal 120(1) is applied to AND gate 82 along with the "one" signal 107–2 provided by the bistable multivibrator 30 thus enabling AND gate 82 to pass the fast read-out shift pulses 122 to the shift pulse input circuit 57 of shift register 29. The fast read-out shift pulses 122 are counted by counter 85 and the fourth fast read-out shift pulse 122 thus actuates counter 85 to provide a signal in its output circuit 86 which is applied to the "reset" input circuit of bistable multivibrator 87 to reset the same thereby to terminate enabling signal 120(1) and thus to terminate passage of the fast read-out shift pulses to the shift pulse input circuit 57, four of the fast read-out shift pulses 122 thus being passed. These four fast read-out shift pulses 122 shift the four "white" elements of video signal 116–3 out of the shift register 29 at the fast rate. However, the resultant video signal shifted out of the shift register 29 at the fast rate is not passed by AND gate 92 to its output circuit 93, since it will be observed that the "one" level enabling signal 121 applied to AND gate 92 from the "zero" output circuit 94 of bistable multivibrator 87 is removed during the enabling signal 120(1), as shown at 120(0) in FIG. 3Q, thus disabling AND gate 92. However, it is seen that the "one" enabling signal 120(1) provided by bistable multivibrator 87 is applied to AND gate 96 thus enabling the same to provide the fourth level signal 123 in its output circuit which is applied to the input circuit 70 of transmitter 72 and thus transmitted by the transmission facility 74.

When the "one" enabling signal 120(1) provided by bistable multivibrator 87 has been terminated, the fifth "white" element of video signal 116–3 and the four "black" elements of video signal 116–4 are respectively stored in the final four sections of shift register 29 so that AND gate 102 is disabled. It will be understood that if upon termination of the enabling signal 120(1) four "white" signal elements having again simultaneously been present in the final four sections of shift register 29, a new redundancy sensing signal 119 would immediately have been provided by the AND gate 102 and a new "one" enabling signal 120(1) generated. However, in the illustrated video signal line 116 in which video signal 116–3 is the only one having four or more "white" signal elements, the successive slow read-out shift pulses 117–7 et seq. continue to shift the video signal 116 out of the shift register 29 at the slow rate to provide in output circuit 93 of AND gate 92 third level signal 118–3 corresponding to the fifth element of video signal 116–3, second level signal 118–4 corresponding to the three "black" elements of video signal 116–4, third level signal 118–5 corresponding to the two "white" elements of video signal 116–5, and second level signal 118–6 corresponding to the two "black" elements of video signal 116–6.

It will be seen that the third and fourth levels of the video signal applied to transmitter 72 by AND gates 92, 96 respectively are respectively provided by the fixed potential sources 95, 97, the second or "black" level in essence being provided by the absence of a signal in the output circuits of AND gates 92, 96. It will be readily understood that a fixed second or "black" level could be provided by the addition of an inverting circuit to invert the signal in output circuit 93 of AND gate 92 coupled to another AND gate along with a source of fixed potential establishing the second level, the output circuit of that additional AND gate being coupled to the input circuit 70 of transmitter 72, as is well known to those skilled in the art.

Referring now to FIG. 3V, it will be seen that the frame synchronizing signal 104–1 and the line synchronizing signal 105(0)–1 are first applied to the transmitter 72 at the first level (shown here to be a negative level) by the OR gate 65 and clamping circuit 67, that the AND gate 92 applies the video signals 118–1, 2, 3, 4, 5, 6 read-out of the shift register 29 at the slow rate by the slow read-out shift pulses 117, and that the fourth level signal 123 is applied to transmitter 72 by the AND gate 96. The fourth level signal 123 thus forms a coded signal component indicating that four "white" signal elements have simultaneously appeared in the shift register 29 and have been shifted out of the shift register at the fast rate.

The slow and fast read-out shift pulses 117, 122 are also applied to and counted by the pulse counter 58. With "n" assumed to be sixteen, as above-described, when a total of sixteen slow and fast shift pulses 117, 122 have been counted by the pulse counter 58, a trigger pulse 115–2 is generated which is applied to the trigger input circuit 33 of bistable multivibrator 30 thus again to cause it to change its state thereby to initiate a new "one" line sync. signal 105(1)–2 in its output circuit 34 and a new "zero" signal 105(0)–2 in its output circuit 35, as shown in FIG. 4D and I. Generation of the "one" line sync. signal 105(1)–2 initiates sawtooth sweep voltage 113–2 and thus scanning of the second line, as established by the second stair-step vertical deflection voltage 109–2, in the camera tube 21 thereby to provide the next video signal line 124 which is shifted into the shift register 29 by read-in shift pulses 114–2, as above described. The second video signal line 124 is shifted into the shift register 29 by the read-in shift pulses 114–2 passed by the AND gate 56, and when the pulse counter 58 has counted n read-in shift pulses (assumed here to be sixteen), trigger pulse 115–3 is generated to terminate the line synchronizing signal 105(0)–1 and to initiate the next "one" enabling signal 107–3 in the output circuit 35 of bistable multivibrator 30, thereby to provide for shifting out of the stored signal at the slow rate as above-described. Initiation of the "one" enabling signal 107–3 causes the differentiating and clipping circuit 38 to generate another line advance pulse 108–3 which is counted by the line counter 52 and which actuates the stair-step generator 39 to provide the next stair-step 109–3.

The generation during successive first and second intervals of line synchronizing signals 105(1) and enabling signals 107–3 during which individual signal lines are first read into storage at a fast rate and then read-out of storage and transmitted at a slow rate continues for the predetermined number of lines constituting one frame, the line counter 52 counting each line advance pulse 108 as above-described. When the line counter 52 has counted the number of line advance pulses 108–3 corresponding to the number of lines in a frame, a new triggering pulse 103–2 is generated and applied to bistable multivibrator 44 to generate a new frame sync. signal 104–2 and thereby to initiate generation and transmission of a new frame in precisely the same manner as above-described in conjunction with FIG. 3.

It will now be seen that if the video signal for a given line contains a series of alternate "white" and "black" signal elements, all of the elements comprising that line will be shifted out of the shift register 29 by the slow read-out shift pulses 117 and thus there will be no reduction in the transmission time. On the other hand, if the video signal for a given line is all at the "white" level, that signal will be entirely shifted out of the shift register 29 by the fast shift pulses 122 and a single fourth level coded video signal transmitted having a duration of one-fourth the duration of the transmitted signal comprising alternate white and black elements, thereby effecting a reduction in transmission time by a factor of four.

Referring now to FIG. 2, there is shown a receiving station, generally indicated at 125, for receiving the video signal transmitted by the transmitting station 20 of FIG. 1 and for converting the same into output information. The receiving station 125 comprises another conventional shift register 126 identical to the shift register 29 of the transmitting station, i.e., having n bit storage capacity. At the receiving station, the second and third level, i.e., "black" and normal "white" level video signals provided by the transmitting station are shifted into the shift register 126 at the same rate they are shifted out of shift register 29 and transmitted, the fourth level coded video signal 123 being employed to shift the received video signal into the shift register 126 at the fast rate, i.e., at the same rate the video signal is shifted out of the shift register 29 by the fast shift pulses 122. The video signal stored in the shift register 126 is shifted out of the shift register and displayed on display tube 127 during the intervening line synchronizing pulses 105 at the same rate as the rate of generation of the initial video signal in the camera tube 21. Thus, the stored video signal for one line is displayed during an interval in which a new video signal for the next line is being generated and stored at the transmitting station.

A conventional receiver 128 is provided having its input circuit 129 coupled to the transmission facility 74 for receiving and demodulating the transmitted video signal, receiver 128 thus providing in its output circuit 130 a four-level composite video signal corresponding to the four-level composite video signal applied to the input circuit 70 of transmitter 72, as above-described. A conventional synchronizing signal and video signal separating circuit 132 is provided having its input circuit coupled to output circuit 130 of receiver 128 and having three output circuits 133, 134 and 135. Sync. and video separate circuit 132 separates the frame and line sync. pulses 104, 105 from the composite video signal, the separated frame sync. pulses 104 appearing in output circuit 133, the separated frame and line sync. pulses 104, 105 appearing in output circuit 134, and the separated three-level black and white video signal appearing in output circuit 135. A conventional video squaring circuit 136 is provided coupled to the output circuit 135 of the separator circuit 132 for squaring the white-black transitions in the video signal. Output circuit 137 of the video squaring circuit 136 is coupled to a conventional threshold detector 138 which detects the fourth level or coded video signal and provides a detected coded signal in its output circuit 139 in response thereto. Output circuit 137 of the video squaring circuit 136 is also coupled to the signal input circuit 140 of the receiving shift register 126. Thus, the "black" signal elements and both the third-level or normal "white" and fourth-level or "fast white" video signal elements are applied to the signal input circuit 140 of the shift register 126.

A read-out clock pulse generator 142 is provided identical to the read-in clock pulse generator 54 of the transmitting station and providing read-out clock pulses having the same repetition rate as the read-in clock pulses provided by the read-in clock pulse generator 54. Read-out clock pulse generator 142 is coupled to conventional pulse generator 143 which in turn is coupled to one of the input circuits of the AND gate 14. A read-in clock pulse generator 145 is provided identical to the read-out clock pulse generator 75 of the transmitting station and providing fast read-in clock pulses having the same repetition rate as the fast read-out clock pulses provided by the read-out clock pulse generator 75. Read-in clock pulse generator 145 is coupled to conventional pulse generator 146 which in turn is coupled to one of the input circuits of AND gate 147. The output circuit 148 of the read-in clock pulse generator 145 is also coupled to conventional dividing circuit 149 identical to the divider 77 of the transmitting station, which, in the illustrated embodiment, divides the frequency of the fast read-in clock pulses provided by read-in clock pulse generator 145 by four to provide slow read-in clock pulses having the same repetition rate as the slow read-out pulses provided by the divider 77. Divider 149 is coupled to conventional pulse generator 150 which is coupled to one of the input circuits of the AND gate 152. Output circuit 137 of the video squaring circuit 136 is coupled to a conventional differentiating circuit 153 which in turn is coupled to the read-out clock pulse generator 142 and the read-in clock pulse generator 145 in order to synchronize them with the read-in clock pulse generator 54 and the read-out clock pulse generator 75 at the transmitting station 20. The frame and line sync. pulse output circuit 134 of the separator circuit 132 is coupled to AND gate 152 and AND gate 147. The coded video signal output circuit 139 of the threshold detector 138 is also coupled to AND gate 147. The output circuits of the AND gates 144, 152, 147 are coupled to shift pulse input circuit 154 of shift register 126.

The frame and line sync. pulse output circuit 134 of separator circuit 132 is coupled to one of the signal input circuits of AND gate 155 by conventional inverting circuit 156, the other signal input circuit of AND gate 155 being coupled to the frame sync. pulse output circuit 133 of separator circuit 132, thus separating the line sync. pulses 105 from the frame sync. pulses 104 with the line sync. pulses 105 alone appearing in output circuit 156 of the AND gate 155. Output circuit 156 of AND gate 155 is coupled to AND gate 144 for applying the separated line sync. pulses 105 thereto.

The last or nth storage section of shift register 126 is coupled to output circuit 157 which in turn is coupled by conventional video amplifier 158 to the video signal input circuit 159 of cathode ray display tube 127, which desirably is a storage display tube. Display tube 127 is provided with conventional vertical and horizontal deflection elements 160, 162, shown here as being conventional deflection yokes. The deflection circuitry associated with display tube 127 is similar to that associated with the camera tube 21 at the transmitting station 20, comprising conventional frame and line deflection circuits 163, 164 respectively coupled to the vertical and horizontal deflection yokes 160, 162, with stair-step function generator 165 coupled to frame deflection circuit 163 and sawtooth sweep voltage generator 166 coupled to the line deflection circuit 164.

The inverted line sync. pulses 105 in the output circuit 156 of AND gate 155 are differentiated by conventional differentiating circuit 167 with the negative spike clipped by clipping circuit 168 to provide leading edge spike 169 in output circuit 170 and with the positive spike clipped by conventional clipping circuit 172 to provide trailing edge spike 173 in output circuit 174. Output circuit 170 is coupled to the sawtooth generator 166 for actuating the same in response to a leading edge spike 169 and output circuit 174 is coupled to stair-step generator 165 for actuating the same to generate the next higher stair-step voltage in response to differentiated trailing edge spike 173. The separated frame sync. pulses 104 are differentiated and the negative spike clipped by conventional differentiating and clipping circuit 175, which in turn is coupled to the "reset" input circuit 176 of the stair-step generator 165 thereby to reset the same in response to the differentiated leading edge spike 177.

Referring now to FIG. 5A there is shown a received and demodulated composite four-level video signal appearing in the output circuit 130 of receiver 128 as a result of transmission of the four-level composite video signal shown in FIG. 3V. As pointed out above, the frame and line sync. signals 104, 105 are transmitted as the first or negative level signals, i.e., negative-going, and thus the output signal appearing in output circuit 134 of the separator circuit 132 intermediate the negative-going line sync. signals 105 is a "one" level signal as shown at 178 in FIG. 5B. The "one" level enabling signal 178 is applied to AND gate 152 thus enabling the same to pass the slow read-in shift pulses 179 to the shift pulse input circuit 154 of shift register 126. It will be observed that the first four slow read-in shift pulses 179-1 through 179-4 sequentially shift the two "white" elements of the received video signal 118-1 and the two "black" elements of received video signal 118-2 into the shift register 126. The fourth level coded video signal component 123 now appears in the received video signal and is detected by the threshold detector 138 to provide coded video signal pulse 180 in its output circuit 139, as shown in FIG. 5D. Detected coded video signal pulse 180 is applied to AND gate 147 along with the "one" enabling signal 178 thereby enabling the same to pass four fast read-in shift pulses 182 to the shift pulse input circuit 154 of shift register 126 thereby to shift the fourth level "fast white" signal 123 into the shift register at the fast rate, it being recalled that the fourth level "fast white" signal 123 corresponds to four "white" video signal elements shifted out of the shift register 29 of the transmitting station 20 at the fast rate. Termination of the coded video signal pulse 180 disables AND gate 147 thereby to terminate the fast read-in shift pulses 182; however, the slow read-in shift pulses 179 continue to be passed by the AND gate 152 in the presence of the enabling signal 178 thereby to shift the remaining "black" and "white" elements of the received video signal into the shift register 126 at the slow rate.

It will be observed that the output signal in output circuit 133 of the separator circuit 132 intermediate the separated negative-going frame sync. pulses 104 is at the "one" level as shown at 183 in FIG. 5H. The separated negative-going line sync. signal 105 which appears at the end of the transmission of one line of stored video signal information, as above-described, is inverted by inverting circuit 156 to provide a "one" signal 105(i) which enables AND gate 155 to provide separated line sync. pulse 105(s) in its output circuit 156. The separated line sync. pulse 105(s) is applied to AND gate 144 and enables the same thereby to pass the readout shift pulses 184 to shift pulse input circuit 154 of shift register 126 thereby to shift the stored video signal sequentially out of the shift register in output circuit 157.

The separated line sync. pulse 105(s) is differentiated by differentiating circuit 167 and its negative peak clipped by clipping circuit 168 to provide positive spike 169 which is applied to sawtooth generator 166 to initiate the sawtooth wave form 170 which is applied to the horizontal deflection yoke 162 of the display tube 127 by the deflection circuitry 164 thereby to scan the line 172 of video signals shifted out of the shift register 126 by the read-out shift pulses 184. It will be observed that the line of video signal 172 shifted out of the shift register 126 and displayed on the display tube 127 corresponds to the initial video signal line 116 in the output circuit 26 of the camera tube 21 as a result of scanning during the previous line synchronizing signal 105.

The trailing edge differentiated signal 173 provided in the output circuit 174 of the differentiating circuit 167 responsive to the trailing edge of the separated line sync. signal 105(s) is applied to the stair-step generator 165 to generate the second stair-step deflection voltage 185-2.

It will be readily understood that at the end of the transmission and storage of a complete frame, the trailing edge differentiated signal 177 responsive to the trailing edge of the separated frame sync. pulse 104 provided by the differentiating and clipping circuit 175 will reset stairstep generator 165 to its lowest level 185–1.

Referring now to FIG. 6 in which like elements are indicated by like reference numerals, there is shown a transmitting station system, generally indicated at 188, utilizing a storage tube 189 rather than the shift register 29 of the embodiment of FIG. 1.

Here, a monostable multivibrator 190 is provided for generating the line sync. pulses 105, monostable multivibrator having "set" and "reset" input circuits 192, 193 and "one" and "zero" output circuits 34, 35 respectively coupled to the differentiating and clipping circuits 36, 38. Output circuit 45 of monostable multivibrator 44 is directly coupled to the "reset" circuit 193 of monostable multivibrator 190 for positively resetting the same to its "zero" state in response to and during a frame synchronizing signal 104. Monostable multivibrator 190 generates line sync. pulse 105 of fixed duration in response to application of a triggering signal on its "set" input circuit 192. Output circuit 45 of monostable multivibrator 44 is again coupled to the "set" input circuit 192 of monostable multivibrator 190 by differentiating and clipping circuit 62 and inverting amplifier 63 thereby applying inverted trailing edge differentiated spike 110i to the input circuit 192 of monostable multivibrator 190 to initiate a new line sync. pulse 105 in response to termination of frame sync. signal 104.

Storage tube 189 is provided with a storage electrode 194, a writing electron gun 195 for directing a writing electron beam toward storage electrode 194, vertical and horizontal deflection electrodes 196, 197 for the writing electron beam, and a collector electrode 198. The output circuit of the video amplifier 27 is coupled to the control grid of writing electron gun 195 thereby to modulate the electron beam in accordance with the video signal in the output circuit of amplifier 27. The writing electron beam provided by the writing gun 195 of the storage tube 189 is scanned across the storage electrode 194 in synchronism with scanning of the camera tube 21, the vertical and horizontal deflection electrodes 196, 197 being respectively connected to the frame and line deflection circuits 24, 25. It will be understood that the modulated writing electron beam provided by the writing gun 195 impinges upon the surface of the storage electrode 194 thus generating a charge pattern thereon by secondary emission, the secondary electrons emitted in response to impingement of the writing electron beam being collected by the collector electrode 198.

The read-out section 199 of the storage tube 189 comprises two electron guns 200, 202 each generating an electron beam of fixed intensity, electron gun 200 generating and directing a "pencil" electron beam 204 toward the storage electrode 194 while the other electron gun 202 generates a flat, narrow electron beam 205, as shown in FIG. 7. The width of the flat electron beam 205 generated by the electron gun 202 is sufficient to embrace the charge pattern on storage electrode 194 corresponding to four video signal elements. The two electron beams 204, 205 are deflected by means of vertical and horizontal deflection electrodes 206, 207, the vertical deflection electrode 206 being coupled to the frame deflection circuitry 24 and thus vertically scanned in stair-step fashion by the stair-step generator 39. Both beams are horizontally scanned by the horizontal deflection electrodes 207, as shown by the arrow 208 in FIG. 7, the flat beam 205 being scanned ahead of the "pencil" beam 204. As will be hereinafter described, the flat beam 204 provides redundancy sensing while the "pencil" beam 204 provides the video output. A conventional target electrode 209 is provided coupled to video signal output circuit 210 and it will be understood that the reading beams directed at the storage electrode 194 will be repelled therefrom in accordance with the charge pattern thereon thereby generating a video signal in the output circuit 210 corresponding to the charge pattern on the storage electrode 194. For a purpose to be hereinafter described, the flat redundancy-sensing beam 205 is modulated by a radio frequency generated by R.F. generator 212 coupled to electron gun 202.

Horizontal deflection elements 207 are coupled to a conventional line deflection circuit 213 which in turn is coupled to a dual slope sawtooth generator 214 which selectively generates a sawtooth wave form 215 having two different slopes to provide a slow or normal sweep rate and a fast sweep rate. Dual slope sawtooth generator 214 is actuated by switch 216 to provide the fast sweep rate. The gradual slope or slow sweep portions 216 of the dual slope sawtooth 215 correspond to the slow sweep read-out shift pulses 117 of the embodiment of FIG. 1 while the steep slope or fast sweep portions 217 correspond to the fast read-out pulses 122. The "one" output circuit 34 of the monostable multivibrator 190 is also coupled to a differentiating and positive spike clipping circuit 218 which in turn is coupled to dual slope sawtooth generator 214 by inverting circuit 219 thereby to actuate dual slope sawtooth generator 214 to initiate a new dual slope sawtooth sweep voltage 215 in response to inverted trailing edge spike 220 coincident with the trailing edge of a line synchronizing pulse 105. The output circuit 222 of a dual slope sawtooth generator 214 is coupled to one of the input circuits of AND gate 223 which has its other input circuit coupled to a source of fixed potential 224 and which has output circuit coupled to the "set" input circuit 192 of the monostable multivibrator 190. It will be observed that the dual slope sawtooth wave form 215 is negative-going and thus a "one" level signal is applied to the AND gate 223 in the absence of a sweep signal 215 thus enabling the same to apply a trigger signal to the monostable multivibrator 190. Thus, upon termination of a sweep signal 215, AND gate 223 is enabled to apply a trigger signal to monostable multivibrator 190 thereby to initiate a new line synchronizing signal 105.

Video signal output circuit 210 of the storage tube 189 is coupled to video amplifier 225 which does not respond to the R.F.-modulated signal generated by beam 205, and thus the signal provided in output circuit 225 of video amplifier 225 is responsive only to the "pencil" beam 204. Output circuit 226 of video amplifier 225 is coupled to AND gate 92. Output circuit 210 is also coupled to a conventional R.F. filter 227 which passes the R.F.-modulated signal responsive to the R.F. modulated beam 205 thus providing in its output circuit 228 a signal responsive to beam 205 but not to beam 204. Output circuit 228 of R.F. filter 227 is coupled to the storage circuit 229 which in turn has its output circuit 230 coupled to the "set" input circuit of monostable multivibrator 231.

Referring briefly to FIG. 8, storage circuit 229 may comprise resistor 232 and storage capacitor 233 coupled to an R.C. time constant circuit with storage capacitor 233 being coupled to the control grid of tube 234 with output circuit 230 coupled in its plate circuit in conventional fashion. The time constant of the R.C. circuit 232, 233 is selected so that capacitor 233 will charge sufficiently to trigger tube 234 into conduction in response to scanning by the flat beam 205 of four adjacent charge elements corresponding to four "white" video signal elements. Thus, when the flat redundancy sensing beam 205 scans four "white" elements on the storage electrode 194, storage circuit 229 provides an output signal to trigger monostable multivibrator 231 to generate enabling pulse 120 in its "one" output circuit 235. It will be understood that monostable multivibrator 231 generates enabling pulse 120 of fixed duration corresponding to the duration of pulse 120 generated by the bistable multivibrator 87 of the embodiment of FIG. 1. "One" output circuit 235 of monostable multivibrator 231 is coupled to AND gate 92 while the "zero" output circuit 236 of monostable multivibrator 231 is coupled to AND gate 96. The "one" output circuit 235 of monostable multivibrator 231 is also coupled to switch 216 which actuates dual slope sawtooth generator 214.

It will now be seen that when the redundancy sensing beam 205 has scanned four adjacent "white" elements on storage electrode 194, a triggering signal is generated by storage circuit 229 which triggers monostable multivibrator 231 to generate enabling pulse 120 which in turn enables AND gate 96 to provide the fourth level coded video signal. Enabling pulse 120 also actuates switch 216 which in turn actuates the dual slope sawtooth generator 214 to provide the steep slope or fast sweep portion 217 of sweep voltage 215 thereby to scan both beams 204 and 205 at the fast rate for the duration of enabling pulse 120, thereby reading out the stored video information at the fast rate.

Referring briefly to FIG. 9, dual slope sawtooth generator 214 may comprise the conventional constant current generator 237 with a capacitor 238 and resistors 239, 240 having values chosen to provide the two different slopes 216, 217 in the dual slope sweep voltage 215. Resistors 239, 240 are selectively connected to a source of charging potential, by switch contacts 242 actuated by operating coil 243, contacts 242 and coil 243 comprising the switch 216.

Referring now to FIG. 10 in which like elements are again indicated by like reference numerals, there is shown a receiving station system, generally indicated at 245, incorporating a storage tube 246 rather than the shift register 126 of the embodiment of FIG. 2. Here, the storage tube 246 may take the form of a conventional scan conversion tube having a storage electrode 247, a writing electron gun 248 for generating a writing electron beam, vertical and horizontal deflection elements 249, 250 for the writing beam, and a conventional collector electrode 252. Here, output circuit 137 of the video squaring circuit 136 is coupled to a conventional pulse generator 253 which in turn is coupled to the control grid of the writing electron gun 248 thus to pulse the writing beam "on" in response to either the third level "normal white" video signals or the fourth level "fast white" video signals, and "off" in response to the second level "black" video signal. Here, vertical deflection electrodes 249 are coupled to conventional frame deflection circuit 254 which in turn is coupled to the stair-step generator 165. The horizontal deflection electrodes 250 are coupled to conventional line deflection circuit 255 which in turn is coupled to a dual slope sawtooth generator 256 which may be identical to the dual slope sawtooth generator 214 of the transmitting station 188. The frame and line synchronizing pulse output circuit 134 of the separator 132 is coupled to differentiating and negative clipping circuit 257 to provide differentiated trailing edge pulses 258 in response to the trailing edges of frame synchronizing signals 104 and line synchronizing signals 105, the differentiated trailing edge signals 258 actuating the dual slope sawtooth generator 256 to initiate the dual slope sawtooth sweep voltages for writing the black and white video signal pulses from the pulse generator 253 onto the storage electrode 247. Output circuit 139 of the fourth level threshold detector 138 is coupled to switch 259, which may be identical to the switch 216 of the transmitting station 188, which in turn is coupled to the dual slope sawtooth generator 256 for actuating the same to provide the steep slope or fast sweep in response to the coded signal 180.

It is thus seen that the video signal is normally written onto the storage electrode 247 of storage tube 246 at the slow rate corresponding to slow read-in shift pulses 179 of the embodiment of FIG. 2, the rate being increased in response to the coded signal 180 to the fast rate corresponding to the fast read-in shift pulses 182.

The read-out section 260 of the storage tube 246 comprises constant intensity electron gun 262, vertical and horizontal deflection electrodes 263, 264 and target electrode 265. Vertical deflection electrodes 263 are coupled to the frame deflection circuit 254 and stair-step generator 165. Horizontal deflection electrodes 264 are coupled to conventional line deflection circuit 266 which in turn is coupled to sawtooth generator 267. Sawtooth generator 267 generates a sawtooth line sweep wave form having a slope corresponding to the rate of read-out shift pulses 184 in the embodiment of FIG. 2. Negative clipping circuit 168 is coupled to the sawtooth generator 267 to initiate a respective line sweep sawtooth signal in response to the differentiated leading edge signal 169 coincident with the leading edge of a line sync. pulse 105. Target electrode 265 is coupled to a conventional video amplifier 268 which in turn is coupled to the video signal input circuit 159 of the display tube 127. Display tube 127 has its vertical and horizontal deflection yokes 160, 162 respectively coupled to the frame deflection circuit 254 and the line deflection circuit 266.

It is thus seen that appearance of a line sync. pulse 105 will actuate the sawtooth generator 267 to provide a readout line sweep sawtooth which will scan the read-out electron beam from the electron gun 262 over the storage electrode 247 thereby to generate a read-out video signal in the target electrode 265 which is applied to display tube 127, the beam in the display tube being scanned in synchronism with the read-out beam in the storage tube 246. It will be readily seen that the display tube 127 is desirably of the storage variety.

Referring now to FIG. 11 in which like elements are still indicated by like reference numerals, there is shown another receiving station, generally indicated at 270 in which the storage unit of the previous embodiments has been eliminated and with a storage display tube 272 being employed. Here, the output circuit of the video amplifier 158 is directly coupled to the control grid of the writing gun 271 of the storage display tube 272 and the frame and line deflection circuits 254, 255 are directly coupled to the vertical and horizontal deflection yokes 273, 274 associated with the writing gun. Thus, the black and white video signal output of the video amplifier 158 is written directly onto the storage electrode of the storage display tube 272 at the slow sweep rate in the absence of coded signal 120 and at the fast rate in the presence of the signal 120 provided by the threshold detector 138, in the same manner as writing the video signal into the storage tube 246 in the embodiment of FIG. 10. However, in the embodiment of FIG. 11, the stored information on the storage electrode is directly displayed by the reading or flood beam, either continuously as it is written onto the storage electrode, or during the line synchronizing signals 104, as is well known to those skilled in the art. In order to erase the displayed image following presentation of one complete frame, the differentiating and negative clipping circuit 175 coupled to the frame sync. pulse output circuit 133 of separator 132 is coupled to a conventional erased control circuit 275 so that the erase control circuit is actuated in response to the trailing edge differentiated signal 177 coincident with the trailing edge of a frame synchronizing pulse 104.

While there have been described above the principles of this invention in connection with specific apparatus, it is to be clearly understood that this description is made only by way of example and not as a limitation to the scope of the invention.

What is claimed is:

1. An information transmission system comprising: selectively actuable means for generating at a fixed rate an initial time-based electrical signal conveying the information to be transmitted; means for actuating said initial signal generating means during first spaced intervals; time-based signal storage means for storing said initial signal during said first intervals; selectively actuable means including said storage means for generating a second time-based electrical signal responsive to the stored initial signal during second intervals respectively intermediate said first intervals; means for normally actuating said second signal generating means to generate said second signal at a first rate; means for transmitting said second signal and for receiving the same; means for sensing the simultaneous presence in said first storage means during said second intervals of a predetermined amount of adjacent redundant information in the signal stored therein; means for actuating said second signal generating means in response to said first sensing means to generate said second signal at a second rate faster than said first rate for the duration of said redundant information; means for modifying the transmitted second signal to provide a coded signal component in response to said sensing means; and means for converting the received second signal into output information.

2. The system of claim 1 wherein said converting means comprises: means for decoding the received second signals thereof to separate said coded signal component; second selectively actuable time-based signal storage means for storing the received second signals during said second intervals; means for normally actuating said second storage means to store said second signals at said first rate; means for actuating said second storage means in response to said separated signal component to store said second signals at said second rate; and means including said second storage means for converting the stored second signals therein into output information.

3. The system of claim 2 further comprising: second means for sensing said first intervals in the received signal; and wherein said last-named means comprises selectively actuable means for generating a third time-based electrical signal responsive to the stored second signal, and means responsive to said second sensing means for actuating said third signal generating means during said first intervals.

4. In an information transmission system including selectively actuable means for generating at a first rate an initial time-based electrical signal conveying the information to be transmitted, means for converting a time-based electrical signal to output information and means for transmitting a time-based electrical signal from said generating means to said converting means; transmission time-bandwidth reduction means comprising first means coupling said generating means and said transmitting means and including means for actuating said initial signal generating means during first spaced intervals; first time-based signal storage means for storing said initial signal during said first intervals; selectively actuable means including said first storage means for generating a second time-based electrical signal responsive to the stored initial signal during second intervals respectively intermediate said first intervals; means for normally actuating said second signal generating means to generate said second signal at a first rate; first means for sensing the simultaneous presence in said first storage means during said second intervals of a predetermined amount of adjacent redundant information in the signal stored therein during said second intervals; means for actuating said second signal generating means in response to said first sensing means to generate said second signal at a second rate faster than said first rate for the duration of said redundant information; means for modifying said second signal to provide a coded signal component in response to said first sensing means; and means for coupling said second signal to said transmitting means; and second means coupling said transmitting means to said converting means and including second means for sensing said first intervals intermediate said second signals; means for decoding said second signal thereby to separate said coded signal components; second selectively actuable time-based signal storage means for storing said separated second signals during said second intervals; means for normally actuating said second storage means to store said second signal at said first rate; means for actuating said second storage means in response to said separated signal component to store said second signal at said second rate; selectively actuable means including said second storage means for generating a third time-based electrical signal responsive to the stored second signal for conversion by said converting means; and means responsive to said second sensing means for actuating said third signal generating means during said first intervals.

5. The system of claim 4 wherein each of said time-based signals comprises binary pulses having upper and lower amplitude levels, and wherein said coded component of said second time-based signal comprises a third amplitude level.

6. The system of claim 5 wherein each of said first and second storage means are shift register means.

7. The system of claim 4 wherein said first intervals are of fixed duration.

8. The system of claim 4 wherein said initial signal generating means comprises camera tube means having rectilinear scanning means and line and frame sweep generating means, said first-named actuating means being coupled to said line and frame sweep generating means for actuating the same to provide one scanning line during each said first interval.

9. The system of claim 4 wherein said converting means comprises display tube means having rectilinear scanning means and line and frame sweep generating means, said last-named actuating means being coupled to said line and frame sweep generating means for actuating the same to provide one scanning line during each said first interval.

10. The system of claim 4 wherein said initial signal generating means comprises camera tube means having rectilinear scanning means and first line and frame sweep generating means, said first-named actuating means being coupled to said first line and frame sweep generating means for actuating the same to provide one scanning line during each said first interval, said first-named selectively actuable means including means coupled to said first-named actuating means for initiating a new first interval and scanning line at the end of a said second interval, said converting means comprising display tube means having rectilinear scanning means and second line and frame sweep generating means, said last-named actuating means being coupled to said second line and frame sweep generating means for actuating the same to provide one scanning line in said display tube means during each said first interval.

11. In an information transmission system including selectively actuable means for generating an initial time-based electrical signal at a first rate conveying the information to be transmitted, means for converting a time-based electrical signal to output information, and means for transmitting a time-based electrical signal from said generating means to said converting means; transmission time-bandwidth reduction means comprising means coupling said initial signal generating means and transmitting means and including selectively actuable means for generating a first control signal of predetermined fixed duration; first means coupling said first control signal generating means to said initial signal generating means for actuating the same in response to and during said first control signal; second means coupling said first control signal generating means to said transmitting means whereby said first control signal is transmitted to said converting means; first time-based signal storage means having signal input and output circuit means; third means coupling said initial signal generating means to said signal input circuit means for storing said initial signal at said first rate during said first control signal; selectively actuable means coupled to said first storage means for generating in said output circuit means a second time-based electrical signal responsive to the stored initial signal; means for normally actuating said second signal generating means to generate said second signal at a relatively slow rate; fourth means coupling said first control signal generating means to said second signal generating means for actuating the same to initiate said second signal responsive to termination of said first control signal; means coupled to said first storage means for sensing the simultaneous presence of a predetermined amount of adjacent redundant information in the signal stored therein and for generating a second control signal in response thereto; fifth means coupling said sensing means to said second signal generating means for actuating the same in response to said second control signal to generate said second signal at a relatively fast rate for the duration of said redundant information; sixth means coupling said output circuit means to said transmitting means whereby said second signal is transmitted to said converting means; seventh means coupling said sensing means to said sixth coupling means for modifying said second signal in response to said second control signal to provide a coded signal component for the duration of said fast rate; and eighth means coupling said second signal generating means to said first control signal generating means for actuating the same in response to termination of said second signal thereby to generate a new said first control signal; and means coupling said transmitting means to said converting means and including means for detecting the transmitted first control signal; means for decoding the transmitted modified second signal to provide a third control signal in response to said coded signal component and to recover said second signal; second time-based signal storage means having input and output circuit means; ninth means coupling said transmitting means to said last-named input circuit means for storing the received second signal; means for normally actuating said ninth means to store said received second signal at said slow rate; means coupling said decoding means to said ninth means for actuating the same to store said received second signal at said fast rate in response to said third control signal; selectively actuable means coupled to said second storage means for generating at said first rate a third time-based electrical signal in said last-named output circuit responsive to the stored second signal; means coupling said detecting means to said third signal generating means for actuating the same in response to the detected first control signal; and means coupling said last-named output circuit means to said converting means.

12. The system of claim 11 further comprising means coupling said detecting means to said converting means for actuating the same in response to the detected first control signal.

13. The system of claim 11 wherein said initial signal comprises binary pulses, each of said first and second storage means being shift register means; said third coupling means including selectively actuable means for generating first shift pulses for shifting said initial signal into said first storage means, means coupling said first shift pulse generating means to said first control signal generating means for terminating said first control signal after a predetermined number of said first shift pulses, and means coupling said first control signal generating means to said first shift pulse generating means for actuating the same in the presence of said first control signal; said second signal generating means further including means for generating second and third shift pulses at said slow and fast rates, respectively, for shifting said stored initial signal out of said first storage means thereby to provide said second signal; said first control signal generating means being coupled to said second shift pulse generating means for actuating the same in the absence of said first control signal, said sensing means and first control signal generating means being coupled to said third shift pulse generating means for actuating the same in response to said second control signal and in the absence of said first control signal; said eighth coupling means coupling said second and third shift pulse generating means to said first pulse generating means for initiating a new said first control signal in response to said predetermined number of second and third shift pulses; said ninth coupling means further including means for generating fourth and fifth shift pulses at said slow and fast rates for shifting said received second signal into said second storage means, said detecting means being coupled to said fourth shift pulse generating means for actuating the same in the absence of said detected first control signal, said detecting means and decoding means being coupled to said fifth shift pulse generating means for actuating the same both in the absence of said detected first control signal and in respsonse to said third control signal; said third signal generating means including means for generating sixth shift pulses for shifting the stored second signal out of said second storage means, said detecting means being coupled to said sixth shift pulse generating means for actuating the same in the presence of said detected first control signal.

14. The system of claim 11 wherein said initial signal comprises binary pulses, said second coupling means providing a first level for the transmitted first control signal, said second signal comprising binary pulses having second and third levels, said coded signal component comprising a signal having a fourth level.

15. The system of claim 13 wherein each of said shift register means has $n$ storage elements, wherein said predetermined number of shift pulses is $n$, and wherein said sensing means comprising means coupled to a predetermined number of adjacent storage elements of said first shift register means extending from the output circuit means toward the input circuit means thereof for providing said second control signal in response to the stored second signal in each of said predetermined number of storage elements having the same level.

16. In an information transmission system including selectively actuable means for generating at a first rate an initial time-based binary pulsed electrical signal responsive to the information to be transmitted, means for converting a time-based electrical signal to output information, and means for transmitting a time-based electrical signal from said generating means to said converting means: transmission time-bandwidth reduction means comprising selectively actuable means for generating a first control signal; means coupling said first control signal generating means to said initial signal generating means for actuating the same in response to said first control signal; means coupling said first control signal generating means to said transmitting means for transmitting said first control signal as a first level of a transmitted signal; first shift register means having a plurality of storage elements; means coupling said initial signal generating means to said first shift register means for applying said initial signal thereto; means for generatng first shift pulses having a first repetition rate; means for coupling said first shift pulse generating means to said first shift register means responsive to said first control signal thereby to shift said initial signal into said first shift register means at said first rate; means coupled to said first control signal generating means for actuating the same to terminate said first control signal in response to shifting of said initial signal into a predetermined number of said storage elements; means for generating second shift pulses having a second repetition rate substantially lower than said first rate; means for coupling said second shift pulse generating means to said first shift register means responsive to the absence of said first control signal thereby to shift the stored initial signal out of said first shift register means at said second rate; means coupling said first shift register means to said transmitting means for normally transmitting the signal shifted out of said first shift register means on second and third levels, respectively, of said transmitted signal; means coupled to a predetermined number of adjacent storage elements including the storage element to which said last-named means is coupled for sensing the simultaneous presence in said adjacent storage elements of signals having the same level and for providing a second control signal in response thereto; means for generating third shift pulses having a third repetition rate higher than said second rate; means for coupling said third shift pulse generating means to said first shift register means responsive to both the absence of said first control signal and to said second control signal thereby to shift the signals stored in said adjacent storage elements out of said shift register means at said third rate; means coupling said sensing means to said transmitting means for transmitting said second control signal as a fourth level of said transmitted signal; means coupled to said first control signal generating means for actuating the same to initiate a new first control signal in response to shifting of the stored initial signal out of said first shift register means; means coupled to said transmitting means for detecting said first level in said transmitted signal thereby to separate said first control signal therefrom; second shift register means having a plurality of storage elements; means coupling said transmitting means to said second shift register means for applying said transmitted signal thereto; means for generating fourth shift pulses having said second rate; means for coupling said fourth shift pulse generating means to said second shift register means responsive to the absence of said separated first control signal thereby to shift said transmitted signal into said second shift register means at said second rate; means coupled to said transmitting means for detecting said fourth level in said transmitted signal thereby to separate said second control signal thereupon; means for generating fifth shift pulses having said third rate; means for coupling said fifth shift pulse generating means to said second shift register means responsive to both the absence of said separated first control signal and to said separated second control signal thereby to shift said transmitted signal into said second shift register means at said third rate; means for generating sixth shift pulses at said first rate; means for coupling said sixth shift pulse generating means to said second shift register means responsive to said separated first control signal thereby to shift the stored transmitted signal out of said second shift register means at said first rate; and means for coupling said second shift register means to said converting means thereby to convert the signal shifted out of said second shift register means to output information.

17. The system of claim 16 wherein said initial signal generating means comprises camera tube means having rectilinear scanning means and line and frame sweep generating means, said first control signal generating means being coupled to said sweep generating means for providing successive scanning lines respectively responsive to sucecssive first control signals; and wherein said converting means comprises display tube means having rectilinear scanning means and line and frame sweep generating means, said first detecting means being coupled to said last-named sweep generating means for providing successive scanning lines respectively responsive to successive separated first control signals.

18. In an information transmission system including selectively actuable means for generating at a first rate an initial time-based binary pulsed electrical signal responsive to the information to be transmitted, means for converting a time-based electrical signal to output information, and means for transmitting a time-based electrical signal from said generating means to said converting means: transmission time-bandwidth reduction means comprising first bistable pulse generating means for generating a first control signal in one stable state thereof, said first bistable pulse generating means being coupled to said initial signal generating means for actuating the same in response to said first control signal; said first bistable pulse generating means being coupled to said transmitting means for transmitting said first control signal as a first level of a transmitted signal; first shift register means having $n$ storage elements with signal input and output circuits and a shift pulse input circuit coupled thereto, said initial signal generating means being coupled to said signal input circuit; means for generating a train of first shift pulses having a first repetition rate; first gating means coupling said first shift pulse generating means to said shift pulse input circuit, said first bistable pulse generating means being coupled to said first gating means for passing said first shift pulses responsive to said first control signal thereby to shift said initial signal into said first shift register means at said first rate; first means for counting pulses and for providing a second control signal in response to $n$ pulses, said first pulse counting means being coupled to said first bistable pulse generating means; first means coupling said shift pulse input circuit to said first pulse counting means for applying thereto said first shift pulses thereby to provide said second control signal in response to $n$ first shift pulses, whereby said second control signal actuates said first bistable pulse generating means to its other stable state thereby to terminate said first control signal; means for generating a train of second shift pulses having a second repetition rate substantially lower than said first rate; second gating means coupling said second shift pulse generating means to said shift pulse input circuit; said first bistable pulse generating means being coupled to said second gating means for passing said second shift pulses to said shift pulse input circuit responsive to the absence of said first control signal thereby to shift the stored initial signal out of said first shift register means at said second rate; means for generating a train of third shift pulses having a third repetition rate which is an integral multiple of said second repetition rate; means coupled to a predetermined number of adjacent storage elements of said first shift register means including the storage element to which said output circuit is coupled for sensing the simultaneous presence in said adjacent storage elements of signals having the same level and for providing a third control signal in response thereto; second bistable pulse generating means for generating a fourth control signal in one stable state thereof, said sensing means being coupled to said second bistable pulse generating means for actuating the same to said one stable state in response to said third control signal; third gating means coupling said third shift pulse generating means to said shift pulse input circuit; said first and second bistable pulse generating means being coupled to said third gating means for passing said third shift pulses to said shift pulse input circuit responsive to both the absence of said first control signal and to said fourth control signal thereby to shift said stored initial signal out of said first shift register means at said third rate; second counting means coupled to said third gating means for counting the third shift pulses passed thereby and for providing a fifth control signal in response to a number of said third shift pulses equal to said predetermined number of adjacent storage elements, said second counting means being coupled to second bistable pulse generating means for actuating the same to its other state in response to said fifth control signal thereby to terminate said fourth control signal; second means coupling said output circuit to said transmitting means for normally transmitting the signal shifted out of said first shift register means as second and third levels, respectively, of said transmitted signal; means coupling said second bistable pulse generating means to said transmitting means for transmitting said fourth control signal as a fourth level of said transmitted signal; said first coupling means applying said second and third shift pulses to said first pulse counting means thereby to provide said second control signal in response to $n$ second and third shift pulses whereby said second control signal actuates said first bistable pulse generating means to its one stable state thereby to initiate a new first control signal; first means coupled to said transmitting means for detecting said first level in said transmitted signal thereby to separate said first control signal therefrom; second shift register means having *n* storage elements with signal input and output circuits and a shift pulse input circuit coupled thereto; second means coupled to said transmitting means for detecting said fourth signal level in said transmitted signal thereby to separate said fourth control signal therefrom; third means coupling said transmitting means to said last-named signal input circut; means for generating a train of fourth shift pulses having said second repetition rate; fourth gating means coupling fourth shift pulse generating means to said last-named shift pulse input circuit, said first detecting means being coupled to said fourth gating means for passing said fourth shift pulses in response to the absence of said separated first control signal thereby to shift the received signal into said second shift register means at said second rate; means for generating a train of fifth shift pulses having said third repetition rate; fifth gating means coupling said fifth shift pulse generating means to said last-named shift pulse input circuit, said first and third detecting means being coupled to said fifth gating means for passing said fifth shift pulses responsive to both the absence of said separated first control signal and to said separated fourth control signal thereby to shift said received signal into said second shift register means at said third rate; means for generating a train of sixth shift pulses at said first rate; sixth gating means coupling said sixth shift pulse generating means to said last-named shift pulse input circuit, said first detecting means being coupled to said sixth gating means for pasisng said sixth shift pulses in response to said separated first control signal thereby to shift the stored received signal out of said second shift register means at said first rate; and means coupling said last-named output circuit to said converting means.

19. The system of claim 18 wherein said initial signal generating means comprises camera tube means having rectilinear scanning means and line and frame sweep generating means therefor; said first bistable pulse generating means being coupled to said line and frame sweep generating means for providing successive scanning lines respectively responsive to successive first control signals; and further comprising third means for counting said scanning lines and for providing a frame blanking signal in response to a predetermined number of said scanning lines; means coupling said third counting means to said frame sweep generating means for resetting the same to initiate a new frame sweep in response to said frame blanking signal; and means coupling said third counting means to said first bistable pulse generating means for actuating the same to said other stable state in response to initiation of said frame blanking signal and to said one stable state in response to termination of said frame blanking signal thereby to initiate a new first control signal; said third counting means being coupled to said transmitting means for transmitting said frame blanking signal as said first level of said transmitted signal; and wherein said converting means is a display tube comprising rectilinear scanning means and line and frame sweep generating means therefor; said first detecting means including fourth means for detecting and separating said frame blanking signal, said first detecting means being coupled to said last-named line and frame sweep generating means for providing successive scanning lines repectively responsive to successive separated first control signals, said fourth detecting means being coupled to said last-named frame sweep generating means for resetting the same to initiate a new frame sweep in response to a said separated frame blanking signal.

20. The method of information transmission comprising the steps of: generating an initial time-based electrical signal conveying the information to be transmitted during successive spaced first intervals; normally sequentially storing said initial signal during said first intervals; generating at a first rate a second time-based electrical signal responsive to the stored initial signal during successive second intervals intermediate said first intervals; sensing the simultaneous presence in the stored initial signal of a predetermined amount of adjacent redundant information and increasing the rate of generation of said second signal to a second rate in response thereto for the duration of said redundant information; modifying said second signal to provide a coded signal component in response to said sensing; transmitting said second signal during said second intervals and receiving the same; separating the coded signal components from the received second signals; sequentially storing the received second signals at said first rate; increasing the rate of storage of the received second signals to said second rate in response to said separated coded signal components; and converting the stored second signals to output information.

21. The method of information transmission comprising the steps of: generating an initial time-based electrical signal conveying the information to be transmited during successive spaced first intervals; sequentially storing said initial signal during said first intervals; normally generating at a first rate a second time-based electrical signal responsive to the stored initial signal during successive second intervals intermediate said first intervals; sensing the simultaneous presence in the stored initial signal of a predetermined amount of adjacent redundant information and increasing the rate of generation of said second signal to a second rate in response thereto for the duration of said redundant information; modifying said second signal to provide a coded signal component in response to said sensing; transmitting said second signal during said second intervals and receiving the same; detecting said first intervals intermediate the received second signals; separating the coded signal components from the received second signals; sequentially storing the received second signals during said second intervals at said first rate; increasing the rate of storage of the received second signals to said second rate in response to said separated coded signal components; generating third time-based electrical signals responsive to the stored second signals during said first intervals; and converting said third signals to output information.

22. The method of claim 21 wherein said initial and third signals are video signals generated in successive scanning lines with one line being generated during each said first interval.

23. The method of claim 21 wherein said signals are binary pulsed, wherein said second signal is generated on first and second levels, and wherein said modifying step comprises providing a third level on said second signal.

24. The method of information transmission comprising the steps of generating a first control signal of fixed duration; generating an initial time-based electrical signal conveying the information to be transmitted during said first control signal; sequentially storing said initial signal during said first control signal; normally generating at a first rate a second time-based electrical signal responsive to the stored initial signal upon termination of said first control signal; sensing the simultaneous presence in the stored initial signal of a predetermined amount of adjacent redundant information and increasing the rate of generation of said second signal to a second rate in response thereto for the duration of said redundant information; transmitting said second signal as it is generated and receiving the same; modifying the transmitted second signal to provide a coded signal component therein in response to said sensing; initiating a new first control signal upon completion of the generation of said second signal; detecting the intervals intermediate the received second signals and generating second control signals in response thereto; separating the coded signal components from the received second signals; sequentially storing the received second signals at said first rate; increasing the rate of storage of the received second signals to said second rate in response to the separated coded signal components; generating third time-based electrical signals respectively responsive to the stored second signals during said second control signals; and converting said third signals to output information.

25. The method of information transmission comprising the steps of: initiating a first control signal; generating an initial time-based electrical signal conveying the information to be transmitted in response to said first control signal; transmitting said first control signal and receiving the same; dividing said initial signal into equal increments and sequentially storing a predetermined number of said increments; terminating said first control signal in response to storage of said predetermined number of increments; normally generating at a first rate in response to termination of said first control signal a second time-based electrical signal having increments respectively responsive to the stored initial signal increments; sensing the simultaneous presence in the stored initial signal of a predetermined number of adjacent redundant increments and generating a second control signal in response thereto; increasing the rate of generation of said second signal to a second rate in response to said second signal and maintaining said second rate until increments of said second signal have been generated in response to all of said redundant increments; transmitting said second signal as it is generated and receiving the same; modifying the transmitted second signal to provide a coded signal component therein in response to said second control signal; initiating a new first control signal in response to completion of generation of second signal increments equal to said predetermined number of initial signal increments; detecting the first control signals in the received signal; separating the coded signal components from the received second signals; sequentially storing said increments of the received second signals at said first rate; increasing the rate of storage of the received second signal increments to said second rate in response to the separated coded signal components; generating in response to the detected first control signals third time-based electrical signals respectively responsive to the stored second signals; and converting said third signals to output information.

26. The method of television transmission comprising the steps of: initiating a first control signal; initiating generaton in response to said first control signal of one scanning line of an initial time-based video signal conveying the information to be transmitted in the form of binary pulses having upper and lower levels; transmitting said first control signal on a first level and receiving the same; dividing said initial signal into equal increments and sequentially storing a predetermined number of said increments at a first rate; terminating said first control signal in response to storage of said predetermined number of increments and terminating generation of said one scanning line in response thereto; normally generating at a relatively slow rate in response to termination of said first control signal a second time-based video signal having increments respectively responsive to the stored initial signal increments; sensing the simultaneous presence in the stored initial signal of a predetermined number of adjacent redundant increments having the same level and generating a second control signal in response thereto; increasing the rate of generation of said second signal to a relatively fast rate in response to said second signal and maintaining said fast rate until increments of said second signal have been generated in response to all of said redundant increments; transmitting said second signal as it is generated on second and third levels and receiving the same; modifying the transmitted second signal to provide a fourth level in response to said second control signals; initiating a new first control signal in response to completion of the generation of second signal increments equal to said predetermined number of initial signal increments and initiating generation of the next line of a frame in response thereto; detecting said first level in the received signal and generating a third control signal in response thereto corresponding to said first control signal; detecting said fourth level in said received signal and generating a fourth control signal in response thereto corresponding to said second control signal; sequentially storing the increments of the received second signal at said slow rate; increasing the rate of storage of the received second signal increments to said fast rate in response to said fourth control signals; generating at said first rate in response to said third control signal a third time-based video signal responsive to the stored second signal; and displaying said third signals in successive scanning lines in response to said third control signals.

27. The method of information transmission comprising the steps of: generating an initial time-based electrical signal conveying the information to be transmitted during successive spaced first intervals; normally sequentially storing said initial signal during said first intervals; generating at a first rate a second time-based electrical signal responsive to the stored initial signal during successive second intervals intermediate said first intervals; sensing the simultaneous presence in the stored initial signal of a predetermined amount of adjacent redundant information and increasing the rate of generation of said second signal to a second rate in response thereto for the duration of said redundant information; modifying said second signal to provide a coded signal component in response to said sensing; transmitting said second signal during said second intervals and receiving the same; and converting the received second signal into output information.

References Cited

UNITED STATES PATENTS 2,996,581  8/1961  Lord et al. _____ 178—6

ROBERT L. GRIFFIN, *Primary Examiner.*

R. L. RICHARDSON, *Assistant Examiner.*